United States Patent
Tanaka et al.

(10) Patent No.: US 6,348,286 B1
(45) Date of Patent: Feb. 19, 2002

(54) ALKALINE BATTERY SEPARATOR AND PROCESS FOR PRODUCING THE SAME

(75) Inventors: Masanao Tanaka; Kazuya Sato; Koichi Kato; Yasuhiro Ito; Hiroaki Yamazaki; Masaki Hirooka; Yoshiaki Kawatsu, all of Ibaraki (JP)

(73) Assignee: Japan Vilene Co., Ltd., Tokyo (JP)

( * ) Notice: Subject to any disclaimer, the term of this patent is extended or adjusted under 35 U.S.C. 154(b) by 0 days.

(21) Appl. No.: 09/493,533

(22) Filed: Jan. 28, 2000

(30) Foreign Application Priority Data

Jul. 30, 1999 (JP) .......................... 11-247808

(51) Int. Cl.$^7$ ............... H01M 2/16; H01M 2/18
(52) U.S. Cl. .............. 429/247; 429/248; 429/249
(58) Field of Search ................. 249/247, 248, 249/249

(56) References Cited

U.S. PATENT DOCUMENTS

| | | | | |
|---|---|---|---|---|
| 4,741,979 A | * | 5/1988 | Faust et al. | 429/249 |
| 4,812,145 A | * | 3/1989 | LaBonte | 429/249 |
| 6,071,651 A | * | 6/2000 | Forte et al. | 429/247 |

* cited by examiner

*Primary Examiner*—Hoa Van Le
(74) *Attorney, Agent, or Firm*—Darby & Darby

(57) ABSTRACT

An alkaline battery separator comprising a fiber sheet containing, on outer surfaces of fibers forming a surface of the fiber sheet, a substance having a peak of a bond energy at 530.5 to 531.5 eV which is measured by an X-ray photoelectron spectrometer at a photoelectron-taking-off angle of about 30°; a fiber sheet containing a larger amount of carboxyl groups bonded to surfaces of fibers forming an inside of the fiber sheet than an amount of carboxyl groups bonded to outer surfaces of fibers forming a surface of the fiber sheet; or a fiber sheet capable of entrapping ammonia in an amount of 0.4 mmol/g or more in average is disclosed.

28 Claims, 3 Drawing Sheets

ALKALINE BATTERY SEPARATOR AND PROCESS FOR PRODUCING THE SAME

BACKGROUND OF THE INVENTION

1. Field of the Invention

The present invention relates to an alkaline battery separator, i.e., a separator for an alkaline battery, and a process for producing the same. In the specification, the "alkaline battery separator" will be sometimes referred to as the "separator".

The alkaline battery separator of the present invention may be used in, for example, an alkaline primary battery, such as an alkaline-manganese battery, a mercury battery, a silver oxide battery, or an air battery, or an alkaline secondary battery, such as a nickel-cadmium battery, a silver-zinc battery, a silver-cadmium battery, a nickel-zinc battery, a nickel-hydrogen battery or a chargeable alkaline-manganese battery. The separator of the present invention is preferably used in the nickel-cadmium or nickel-hydrogen battery.

2. Description of the Related Art

In an alkaline battery, a separator is installed between a positive electrode and a negative electrode to separate them from each other and prevent a short-circuit, and to hold an electrolyte and thereby smoothly carry out an electromotive reaction. The separator should hold the electrolyte, such as potassium hydroxide, and is preferably made of polyolefin-based fibers having a high alkali resistance.

However, polyolefin-based fiber has a poor affinity for an electrolyte, and thus a separator of the polyolefin-based fibers has a disadvantage in having an insufficient capacity for holding an electrolyte (i.e., the electrolyte-holding capacity). Therefore, a fiber sheet of the polyolefin-based fibers is subjected to various treatments for imparting a hydrophilic property, and thus improving the electrolyte-holding capacity.

A graft-polymerization of vinyl monomers is known as one of the treatments for imparting the hydrophilic property. For example, the Japanese Publication of International Application (Tokuhyo) No. 6-509208 discloses a separator prepared by graft-polymerizing vinyl monomers to a fabric composed of polyolefin-based fibers. This publication also discloses a process for manufacturing the separator, comprising the steps of impregnating the fabric of polyolefin-based fibers with a solution of vinyl monomers, and irradiating the fabric with ultraviolet light under conditions such that the fabric is not exposed to oxygen.

When the resulting separator is installed in a nickel-cadmium or nickel-hydrogen battery or the like, however, deterioration occurs due to the action of oxygen generated upon overcharging, and a short-circuit is caused. Further, an electrode is affected by a product from the deterioration caused by oxygen, and the lifetime of the battery is shortened. Furthermore, the effect for inhibiting a self-discharge is poor.

SUMMARY OF THE INVENTION

The present inventors engaged in research into obtaining an alkaline battery separator without the above disadvantages, and as a result, found that when a fiber sheet used as the separator carries, on outer surfaces of fibers forming the surface of the fiber sheet, a substance having a peak of a bond energy in a particular range, an alkaline battery separator not susceptible to oxygen generated in the battery and exhibiting a high oxidation resistance and an excellent self-discharge inhibition effect can be obtained.

Further, the present inventors found that when, in a fiber sheet used as the separator, the amount of carboxyl groups bonded to surfaces of fibers forming the inside of the fiber sheet is larger than that of carboxyl groups bonded to outer surfaces of fibers forming the surface of the fiber sheet, an alkaline battery separator not susceptible to oxygen generated in the battery and exhibiting a high oxidation resistance and an excellent self-discharge inhibition effect can be obtained. In addition, the present inventors found that a desirable fiber sheet can be prepared by a first graft-polymerization in the presence of oxygen, and a second graft-polymerization under the condition that the fiber sheet is surrounded with a gas-nonpermeable film.

Further, the present inventors engaged in research into obtaining an alkaline battery separator exhibiting an excellent self-discharge inhibition effect, and as a result, found that when a fiber sheet used as the separator entraps a large amount of ammonia, an alkaline battery separator exhibiting a very excellent self-discharge inhibition effect can be obtained, and that the fiber sheet capable of entrapping a large amount of ammonia can be prepared by, for example, carrying out the first and second graft-polymerization procedures, using a graft-polymerizing liquid containing a surface active agent. When the resulting fiber sheet is used as an alkaline battery separator, not only is the self-discharge inhibitory effect is very excellent, but also an excellent wettability is obtained. Further, the resulting batteries show a good consistency in the rate of capacity maintained. The present invention is based on the above findings.

Accordingly, the object of the present invention is to provide an alkaline battery separator not susceptible to oxygen generated in the battery and exhibiting an excellent oxidation resistance and an excellent self-discharge inhibition effect, and a process for producing the same.

Another object of the present invention is to provide an alkaline battery separator exhibiting an excellent self-discharge inhibition effect, particularly an alkaline battery separator exhibiting an excellent self-discharge inhibition effect, an excellent wettability, and an excellent consistency in the rate of capacity maintained, and a process for producing the same.

Other objects and advantages of the present invention will be apparent from the following description.

In accordance with the present invention, there is provided an alkaline battery separator comprising a fiber sheet containing, on outer surfaces of fibers which form a surface of the fiber sheet, a substance having a peak of a bond energy at 530.5 to 531.5 eV (electron volt) as measured by an X-ray photoelectron spectrometer at a photoelectron-taking-off angle of about 30°. Hereinafter, the fiber sheet of this embodiment will be sometimes referred to as a surface-oxidized fiber sheet.

Further, in accordance with the present invention, there is provided an alkaline battery separator comprising a fiber sheet containing a larger amount of carboxyl groups bonded to and present in surfaces of fibers forming an inside of the fiber sheet than the amount of carboxyl groups bonded to and present in outer surfaces of fibers forming a surface of the fiber sheet. Hereinafter, the fiber sheet of this embodiment will be sometimes referred to as an internally highly-carboxylated fiber sheet.

Further, in accordance with the present invention, there is provided an alkaline battery separator comprising a fiber sheet capable of entrapping ammonia in an amount of 0.4 mmol/g or more in average. Hereinafter, the fiber sheet of this embodiment will be sometimes referred to as a high ammonia-entrapping fiber sheet.

An "average amount of ammonia entrapped" as used herein means an average of values measured at 10 or more points randomly selected, for an amount of entrapped ammonia. The "average amount of ammonia entrapped" can be obtained by measuring an amount of entrapped ammonia at 10 or more points randomly selected in a fiber sheet to be examined, according to a process mentioned below, and calculating the average.

In the present specification, a fiber sheet having at least one of the properties of the surface-oxidized fiber sheet, the internally highly-carboxylated fiber sheet and the high ammonia-entrapping fiber sheet, or combination thereof, will be sometimes collectively referred to as a highly functional fiber sheet.

Further, in accordance with the present invention, there is provided a process for producing an alkaline battery separator comprising the steps of subjecting a fiber sheet to which graft-polymerizing liquid containing graft-polymerizable monomers, oligomers, and/or polymers are attached, to a first graft-polymerizing treatment in the presence of oxygen, and then subjecting the fiber sheet to a second graft-polymerizing treatment under the condition that the fiber sheet is surrounded with a gas-nonpermeable film, to thereby obtain a graft-polymerized fiber sheet for the alkaline battery separator.

Further, in accordance with the present invention, there is provided a process for producing an alkaline battery separator comprising the steps of subjecting a fiber sheet to which a graft-polymerizing liquid containing graft-polymerizable monomers, oligomers, and/or polymers and 0.01 to 3 mass % of a surface active agent is attached, to a first graft-polymerizing treatment in the presence of oxygen, and then subjecting the fiber sheet a second graft-polymerizing treatment under the condition that both sides of the fiber sheet are fully covered with a gas-nonpermeable film, to thereby obtain a graft-polymerized fiber sheet for the alkaline battery separator.

DESCRIPTION OF THE PREFERRED EMBODIMENTS

Figure 1:
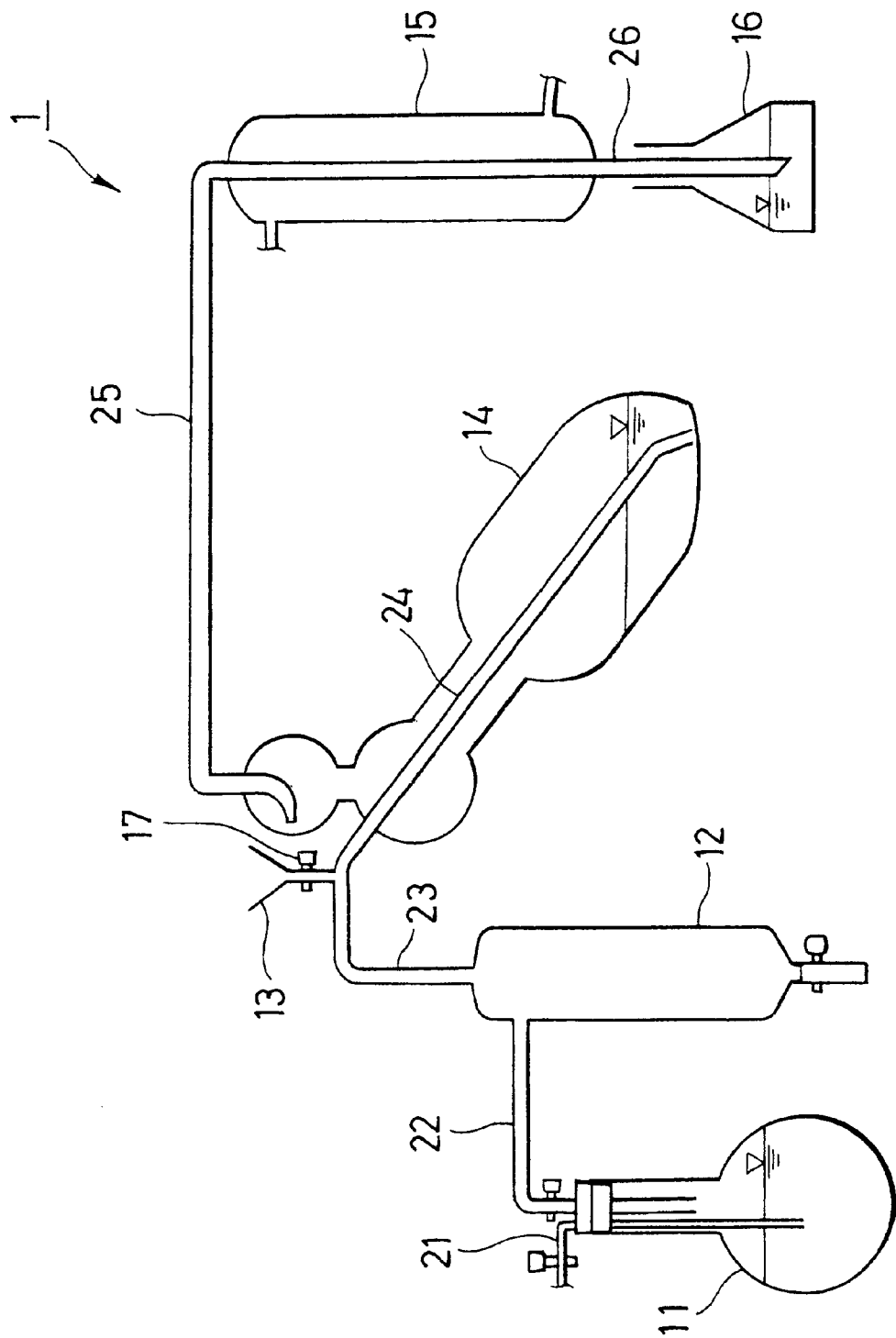
FIG. 1 schematically illustrates a device for measuring the amount of ammonia entrapped.

In the surface-oxidized fiber sheet able to be used as the alkaline battery separator of the present invention, the substance having a peak of a bond energy at 530.5 to 531.5 eV (electron volt) is detected when the outer surfaces of the fibers which form the surface of the fiber sheet are measured by an X-ray photoelectron spectrometer at a photoelectron-taking-off angle of about 30°. It is surmised that the substance having the peak of a bond energy at 530.5 to 531.5 eV is an oxygen atom and/or an oxygen molecule, and that even if oxygen is generated upon overcharging, further oxidization does not occur, because the separator carries the oxygen atoms and/or oxygen molecules. Thus, the separator is not easily subjected to deterioration, i.e., not susceptible to oxygen.

When oxygen is present in the form of $C=O$ or $O-C=O$, the peak is detected at 532 to 533 eV, and when oxygen is present in the form of $C-O$, the peak is detected at 533.5 to 534.5 eV. Therefore, it is surmised that the substance having the peak at 530.5 to 531.5 eV is present in the form of a particular bonding state other than $C=O$, $O-C=O$, or $C-O$. Because the measurement by an X-ray photoelectron spectrometer is carried out in a vacuum, substances merely physically attached to the surfaces must be detached therefrom, and cannot be detected. If vinyl monomers, oligomers, and/or polymers are graft-polymerized by a conventional method, the substance having the peak at 530.5 to 531.5 eV cannot be detected.

In the internally highly-carboxylated fiber sheet able to be used as the alkaline battery separator of the present invention, the amount of carboxyl groups bonded to and present on the surfaces of the fibers forming an inside of the fiber sheet is larger than the amount of carboxyl groups bonded to and present on the outer surfaces of the fibers forming a surface of the fiber sheet. When the surfaces of fibers forming the inside and the surface of the internally highly-carboxylated fiber sheet are measured by an X-ray microanalyzer, the amount of carboxyl groups bonded to and present on the surfaces of the fibers forming the inside of the fiber sheet is larger than the amount of carboxyl groups bonded to and present on the outer surfaces of the fibers forming a surface of the fiber sheet. The amount of easily oxidizable carboxyl groups are small on the surface of the separator or the region near thereto, and so the separator has a high oxidation resistance. Further, a large amount of carboxyl groups are bonded to and present on the surfaces of the fibers forming the inside of the separator, and thus the separator has an excellent capacity for holding electrolytes.

In the process for producing the separator comprising the surface-oxidized fiber sheet or the internally highly-carboxylated fiber sheet according to the present invention, for example, the fiber sheet to which graft-polymerizable monomers, oligomers, and/or polymers are attached is subjected to a first graft-polymerizing treatment in the presence of oxygen, and subsequently, to a second graft-polymerizing treatment under the condition that the fiber sheet is surrounded with a gas-nonpermeable film. When the first graft-polymerization treatment is carried out in the presence of oxygen, as in the above process, the graft-polymerization of the monomers, oligomers, and/or polymers proceeds. It is surmised that, at the same time, a reaction of adsorbing oxygen atoms and/or oxygen molecules also proceeds on the outer surfaces of the fibers forming the surface of the fiber sheet. Thereafter, the fiber sheet is surrounded with the gas-nonpermeable film, and the second graft-polymerization is carried out on the condition that the monomers, oligomers, and/or polymers evaporated from the graft-polymerizing liquid are not diffused. It is surmised that not only does the reaction of adsorbing oxygen atoms and/or oxygen molecules proceed on the outer surfaces of the fibers forming the surface of the fiber sheet, but also a graft-polymerization proceeds on the surfaces of the fibers forming the inside of the fiber sheet, to thereby impart a hydrophilic property to the fiber sheet. As stated above, it is believed that, according to the process of the present invention, the separator carrying oxygen atoms and/or oxygen molecules bonded to the outer surfaces of the fibers forming the surface of the fiber sheet, i.e., the separator having a high oxidation resistance, can be easily produced. When monomers, oligomers, and/or polymers having carboxyl groups are used, the separator carrying a larger amount of carboxyl groups bonded to the surfaces of the fibers forming the inside of the fiber sheet than the amount of carboxyl groups bonded to the outer surfaces of the fibers forming the surface of the fiber sheet, i.e., the separator having not only a high oxidation resistance but also an excellent capacity for holding electrolytes, can be easily produced.

The expression "fibers forming the surface of the fiber sheet" as used herein means fibers in the fiber sheet or the separator which are fully (i.e., in a full length of the fiber) or partially (i.e., in a part of the fiber) in contact with a hypothetical or virtual smooth surface of a hypothetical or virtual geometrical solid hypothetically circumscribing the fiber sheet. The term "outer surface" as used herein means fiber-surfaces which are in contact with a hypothetical or virtual smooth surface of a hypothetical or virtual geometrical solid hypothetically circumscribing the fiber sheet.

In the present invention, the outer surfaces of the fibers forming the surface of the surface-oxidized fiber sheet are measured by an X-ray photoelectron spectrometer at a generated photoelectron-taking-off angle of about 30°. The term "about 30°" as used herein means 30°±1°. It is necessary to reduce the taking-off angle when a data for only a surface region is required, in a measurement by an X-ray photoelectron spectrometer. However, the reduction of the taking-off angle lessens the sensitivity of the measurement. Therefore, in the present invention, the outer surfaces of the fibers are measured under the condition that the taking-off angle of the generated photoelectrons is about 30°, to obtain the data as to the surface region while maintaining the measuring sensitivity.

When the surface or a region near to the surface contains a large amount of oxygen atoms and/or oxygen molecules, the oxidation resistance is high. When the amount of oxygen atoms and/or oxygen molecules is small in the inside region, i.e., a deep region far from the surface, the capacity for holding electrolytes is enhanced. For example, it is preferable that, in the fiber sheet, the amount of the substances detected to have the peak of a bond energy at 530.5 to 531.5 eV when measured at a photoelectron-taking-off angle of 30° is larger than the amount of the substances detected to have the peak of a bond energy at 530.5 to 531.5 eV when measured at a photoelectron-taking-off angle of 90°.

In the separator comprising the internally highly-carboxylated fiber sheet according to the present invention, the amount of carboxyl groups bonded to and present on the surfaces of the fibers forming the inside of the fiber sheet (the separator) is larger than the amount of carboxyl groups bonded to and present on the outer surfaces of the fibers forming the surface of the fiber sheet (the separator). As stated above, the amount of easily oxidizable carboxyl groups is small in the region (hereinafter referred to as the surface region) which can be measured by an X-ray microanalyzer in the outer surfaces of the fibers forming the surface of the fiber sheet (the separator), and thus a high oxidation resistance is obtained. Further, the amount of carboxyl groups is large in the region (hereinafter referred to as the inside region) which can be measured by an X-ray microanalyzer in the surfaces of the fibers forming the inside of the fiber sheet (the separator), and thus an excellent capacity for holding electrolytes is obtained. The separator has such conditions and thus has an excellent self-discharge inhibitory effect. It is preferable that carboxyl group is absent in the surface region, to ensure a high oxidation resistance.

The highly functional fiber sheet for the alkaline battery separator of the present invention may be a nonwoven, woven, or knitted fabric, or a combination thereof which has the properties of the surface-oxidized fiber sheet, the internally highly-carboxylated fiber sheet, and/or the highly ammonia-entrapping fiber sheet, preferably, a graft-polymerized nonwoven, woven, or knitted fabric, or combination thereof. Of these fabrics, the fiber sheet preferably contains a graft-polymerized nonwoven fabric, more preferably consists essentially of a graft-polymerized nonwoven fabric, because the fibers therein can be three-dimensionally disposed, and thus the capacity for holding electrolytes is good. The highly functional fiber sheet is preferably formed from fibers having a fineness of 0.01 to 4 dtex (decitex), to thereby provide a suitable denseness for avoiding a short-circuit, and a permeability for gases generated.

The present invention will be described hereinafter for an embodiment wherein the highly functional fiber sheet is the graft-polymerized fiber sheet.

The fiber in the highly functional fiber sheet may be, for example, polyolefin-based fibers, such as polypropylene or polyethylene fibers, polyamide fibers, vinylon fibers, vinylidene fibers, polyvinyl chloride fibers, polyester fibers, acrylic fibers, or polyurethane fibers. Of these fibers, a polyolefin-based fiber is preferable to obtain a desirable alkali resistance.

The polyolefin-based fiber may contain a resin component of, for example, polymers from monomers, such as propylene, ethylene, butene or methyl pentene, copolymers of two or more monomers as above, copolymers of the above monomers and vinyl alcohol, acrylic acid or methacrylic acid, for example, ethylene-vinyl alcohol copolymers, ethylene-acrylic acid copolymers, or ethylene-methacrylic acid copolymers. The polyolefin-based fiber may be a single fiber consisting essentially of one resin component as above, or a composite fiber comprising two or more resin components as above. As the composite fiber, there may be mentioned, for example, a sheath-core type, a side-by-side type, an eccentric type, an islands-in-sea type, an orange type or a multiple bimetal type.

The polyethylene-based resin is easily graft-polymerized, and thus the polyethylene-based resin preferably accounts for more than 60% of a total surface area of fibers forming the fiber sheet prior to the graft-polymerization. The resin components forming the fiber surface are preferably ethylene-vinyl alcohol copolymers, ethylene-acrylic acid copolymers, or ethylene-methacrylic acid copolymers, because this allows a rapid graft-polymerization reaction rate and the fibers obtained therefrom are hydrophilic.

The highly functional fiber sheet for the alkaline battery separator of the present invention may contain, for example, one or more fine fibers, high-strength fibers, or fusible fibers.

The fine fiber may be, for example, a fiber having a fineness of 0.55 dtex or less, preferably $7.8 \times 10^{-7}$ dtex to 0.33 dtex. The fine fibers contained can enhance an electrolyte-holding capacity, provide an excellent inhibition of a production of dendrite and a high capacity of a battery, and prolong a lifetime of a battery.

The fine fiber is preferably made of a polyolefin-based polymer having an excellent alkali resistance. A preferable polyolefin-based polymer is, for example, polyethylene, such as low-density polyethylene, linear low-density polyethylene, high-density polyethylene, or ultra-highmolecular-weight polyethylene, polypropylene, polymethylpentene, ethylene-propylene copolymer, or ethylene-butene-propylene copolymer; a polyethylene such as low-density polyethylene, linear low-density polyethylene, or high-density polyethylene, polypropylene, or polymethylpentene being more preferable.

The fine fiber may be formed, for example, by dividing dividable fibers by a physical action (a fluid jet, such as a water jet, or calendering) or a chemical action (a removal of polymers, or swelling of at least one polymer), or by a melt-blown method. Of these methods, it is preferable to form fine fibers having a high strength by dividing dividable fibers. A sectional shape of the preferable dividable fiber is, for example, an islands-in-sea type, an orange type or a multiple bimetal type. The dividable fibers may be prepared by a conventional conjugate spinning process.

The highly functional fiber sheet for the alkaline battery separator of the present invention may contain high-strength fibers having a tensile strength of 4.5 cN/dtex or more. The high-strength fiber has a tensile strength of preferably 6.2 cN/dtex or more, more preferably 8 cN/dtex or more, most preferably 10.7 cN/dtex or more. The term "tensile strength" as used herein means a value measured in accordance with JIS (Japanese Industrial Standard) L1015, a testing method for chemical staple fibers. It is preferable that the highly functional fiber sheet contains the high-strength fibers, because a short circuit between electrodes via an electrode flash which penetrates, during the assembly of the alkaline battery, through the separator from one electrode to another electrode, or tearing by an electrode edge during the assembly of the battery, are avoided.

The high-strength fiber is preferably made of a polyolefin-based polymer having an excellent alkali resistance. A preferable polyolefin-based polymer is, for example, polyethylene, such as low-density polyethylene, linear low-density polyethylene, high-density polyethylene, or ultra-high-molecular-weight polyethylene, polypropylene, polymethylpentene, ethylene-propylene copolymer, or ethylene-butene-propylene copolymer; polypropylene, or ultra-high-molecular-weight polyethylene having an average molecular weight of about 1,000,000 to 5,000,000 are more preferable.

The highly functional fiber sheet for the alkaline battery separator of the present invention may contain fusible fibers. The fusible fibers in the highly functional fiber sheet may be those used in a conventional nonwoven fabrics. When the highly functional fiber sheet contains the fusible fibers, a tensile strength and bending resistance thereof can be enhanced, and thus the alkaline battery can be assembled in a higher yield.

The fusible fiber used preferably contains, at least on a surface thereof, a resin component having a melting point lower than the melting points of all of the constitutional fibers other than the fusible fibers in the highly functional fiber sheet, to avoid any reduction of the strength of all of the constitutional fibers other than the fusible fibers. The component, which is sometimes referred to hereinafter as a low-melting-point component, has a melting point lower than the melting points of all of the constitutional fibers other than the fusible fibers in the highly functional fiber sheet, by preferably 10° C. or more, more preferably 15° C. or more.

The fusible fiber may be formed from one or more polyolefin resins, to obtain a high alkali resistance. As examples of the polyolefin for the fusible fibers, there may be mentioned polyethylene, such as low-density polyethylene, linear low-density polyethylene, high-density polyethylene, or ultra-high-molecular-weight polyethylene, polypropylene, polymethylpentene, ethylene-propylene copolymer, or ethylene-butene-propylene copolymer. When the highly functional fiber sheet contains the ultra-high-molecular-weight polyethylene fibers as the high-strength fiber, the fusible fibers are preferably fused at a temperature lower than a softening point of the ultra-high-molecular-weight polyethylene fiber (for example, 125° C.), to avoid a reduction of the strength of the ultra-high-molecular-weight polyethylene fibers. Therefore, the fusible fiber used in this case preferably contains the low-density polyethylene as the low-melting-point component.

The fusible fiber may be formed from one or more resin components. The fusible composite fiber is preferable, as it will enhance the tensile strength of the alkaline battery separator. If the fusible fiber is a composite fiber containing two or more resin components, the sectional structure thereof may be, for example, of a sheath-core, side-by-side, eccentric, islands-in-sea, multiple bimetal, or orange type.

The ratio of the fine fibers, the high-strength fibers, and/or the fusible fibers contained in the highly functional fiber sheet for the alkaline battery separator of the present invention is not particularly limited. Typically, the highly functional fiber sheet may contain 0 to 70 mass % (preferably 10 to 70 mass %) of the fine fibers, 0 to 70 mass % (preferably 5 to 40 mass %) of the high-strength fibers, and 0 to 95 mass % (preferably 10 to 85 mass %) of the fusible fibers. The highly functional fiber sheet is preferably formed from a combination of the high-strength fibers and the fusible fibers, or the high-strength fibers and the fusible fibers and the fine fibers.

In addition to the fine fibers, the high-strength fibers, and/or the fusible fibers, the highly functional fiber sheet for the alkaline battery separator of the present invention may contain polyolefin-based fibers having a fineness of more than 0.55 dtex, not as the fine fibers, the high-strength fibers, or the fusible fibers. The polyolefin-based fibers as above may provide appropriate air spaces in an alkaline battery separator containing them, and thus provides an excellent gas-permeability.

The highly functional fiber sheet or the separator containing the same preferably has a chemical oxygen demand (hereinafter referred to as "COD") of 250 mg·O/m$^2$ or less. When the COD is more than 250 mg·O/m$^2$, the fiber sheet is severely deteriorated by an action of oxygen, and the lifetime of the battery containing the highly functional fiber sheet as the separator will be shortened. The COD is more preferably 230 mg·O/m$^2$ or less, most preferably 220 mg·O/m$^2$ or less. In the present specification, the value of the COD is measured by a process as mentioned in the Examples.

The high ammonia-entrapping fiber sheet for the alkaline battery separator of the present invention can entrap ammonia in an average amount of 0.4 mmol/g or more, preferably 0.45 mmol/g or more, more preferably 0.5 mmol/g or more. When the average amount of ammonia entrapped is less than 0.4 mmol/g, the self-discharge inhibitory effect may be lower.

As mentioned above, the "average amount of ammonia entrapped" as used herein means an average of values measured at 10 or more points randomly selected, for an amount of entrapped ammonia. The "average amount of ammonia entrapped" can be obtained by measuring an amount of entrapped ammonia at 10 or more points randomly selected in the fiber sheet to be examined, according to the process comprising the following steps (A) to (D), and calculating the average:

(A) Pretreatment of specimens (1) A sample (about 2 g) is taken from a fiber sheet and an accurate weight (W; unit=g) of the sample is precisely weighed (accuracy up to 0.001 g).

(2) A volume of 120 ml of 8 mol/1-KOH aqueous solution is measured in a graduated measuring cylinder, and poured into a 250 ml conical flask with a glass-stopper.

(3) The sample is thoroughly soaked with pure water, then wrung out and cut into small specimens of about 1 cm². These small specimens are put into the conical flask of the above item (2).

(4) Then an accurate volume of 5 ml of 8 mol/1-KOH aqueous solution containing 0.3 mol/1-$NH_3$ (the solution is prepared by adding ammonia chloride to 8 mol/1-KOH aqueous solution so that a concentration of $NH_3$ becomes 0.3 mol/1) is injected by a pipette into the conical flask of the above item (2). After being quickly sealed with the glass-stopper, the conical flask is shaken, so that the specimens are thoroughly dipped therein.

(5) The conical flask containing the specimens is allowed to stand in a thermostatic chamber at 40° C. for 3 days.

(6) Blank tests are carried out for two conical flasks by repeating the above procedures (2) to (5) except that the specimens are not put into the conical flasks.

(B) Distillation of residual ammonia [Distillation by a Micro-Kjeldahl method, using a Parnas-Wagner's distillation apparatus as shown in FIG. 1]

(1) The conical flask is taken from the thermostatic chamber and cooled in tap water.

(2) As shown in FIG. 1, pure water is poured into a round flask 11 for generating steam via a pouring tube 21 in a Parnas-Wagner's distillation apparatus 1, and boiled. Alternatively, it is possible to load directly (not through the pouring tube 21) pure water into the round flask 11 and set the loaded round flask 11 into the distillation apparatus.

(3) Into a flask for entrapping ammonia, i.e., a 500 ml conical flask different from the conical flask of the item (1), 200 ml of pure water is poured. Further, 2.5 ml of 0.1 mol/l hydrochloric acid is injected by a pipette and about 10 droplets of methyl red are added. Then, the 500 ml conical flask is set into the Parnas-Wagner's distillation apparatus 1 as an ammonia-entrapping flask 16, so that lower end of a guide tube 26, which passes through a condenser 15, reaches into a liquid in the 500 ml ammonia-entrapping flask 16.

(4) From the conical flask of the item (1), 25 ml of the ammonia-containing solution is injected by a pipette into a pouring funnel 13 of the Parnas-Wagner's distillation apparatus 1. The ammonia-containing solution is guided into a vacuum bottle 14 via a guide tube 24. After being rinsed with pure water, the pouring funnel 13 is sealed with a clip 17.

(5) Pure water in the round flask 11 of the item (2) is boiled to generate steam. The generated steam passes through a guide tube 22, a drainage tube 12, a guide tube 23 and a guide tube 24, in the above sequential order, and then guided into the vacuum bottle 14. Ammonia in the ammonia-containing solution in the vacuum bottle 14 is evaporated by the steam. The evaporated ammonia passes through a guide tube 25 located on an upper portion of the vacuum bottle 14 and is sent to the condenser 15, where the ammonia is condensed. The condensed ammonia passes through the guide tube 26 and is recovered in the 500 ml ammonia-entrapping flask 16. The above procedure of ammonia distillation is carried out for 10 minutes.

(6) After the ammonia distillation is completed, the 500 ml flask 16 containing entrapped ammonia is removed from the Parnas-Wagner's distillation apparatus 1. An outside surface of the guide tube 26 is washed with distilled water, and the wash is added into the entrapped-ammonia-containing flask 16.

(C) Titration (1) When the solution in the entrapped-ammonia-containing flask of the item (B) (6) is pink, i.e., hydrochloric acid remains, the solution is titrated by dropwise adding a 0.1 mol/l potassium hydroxide aqueous solution to the entrapped-ammonia-containing flask through a burette until the solution turns yellow. In this case, an amount of 0.1 mol/l potassium hydroxide aqueous solution added is $V_1$.

When the solution in the entrapped-ammonia-containing flask of the item (B) (6) is yellow, i.e., hydrochloric acid does not remain, the solution is titrated by dropwise adding a 0.1 mol/l hydrochloric acid aqueous solution to the entrapped-ammonia-containing flask through a burette until the solution turns red. In this case, an amount of 0.1 mol/l hydrochloric acid aqueous solution added is $V_2$.

(2) In the conical flask for the blank tests, the acid is completely exhausted, and the solution turns yellow. The solution is titrated by dropwise adding a 0.1 mol/l hydrochloric acid aqueous solution through a burette until the solution turns red. In this case, an amount of 0.1 mol/l hydrochloric acid added is $V_0$.

(D) Determination of the amount of ammonia entrapped (1) The amount of ammonia entrapped (Cp: unit=mmol $NH_3$/g) is calculated by the equation (1):

$$C_p = (n_o - n_p)/W \tag{1}$$

wherein $n_0$ is an ammonia amount (mmol $NH_3$) which remains in the blank tests, and calculated by the equation (1a):

$$n_0 = (125/25) \times (2.5 + V_0) \times 0.1 \tag{1a}$$

$n_p$ is an ammonia amount $n_1$ (mmol $NH_3$) which is not entrapped by the specimen, and calculated by the equation (1b):

$$n_1 = (125/25) \times (2.5 - V_1) \times 0.1 \tag{1b}$$

or an ammonia amount $n_2$ (mmol $NH_3$) which is not entrapped by the specimen, and calculated by the equation (1c):

$$n_2 = (125/25) \times (2.5 + V_2) \times 0.1 \tag{1c}$$

and $n_o$ is an average of two blank tests.

The high ammonia-entrapping fiber sheet for the alkaline battery separator of the present invention has a capacity for exchanging potassium ions per unit mass (i.e., a potassium-ion-exchangeable capacity) of, preferably 0.3 to 2 meq/g, more preferably 0.4 to 1.7 meq/g, most preferably 0.5 to 1.5 meq/g. When the potassium-ion-exchangeable capacity is less than 0.3 meq/g, the wettability is lowered. When the potassium-ion-exchangeable capacity is more than 2 meq/g, potassium ions in the electrolyte are entrapped, and the concentration of potassium ions is reduced, and thus the lifetime of the battery will be shortened.

The "potassium-ion-exchangeable capacity" as used herein is a value obtained by the following steps (A) to (E):

(A) Preparation of specimens (1) Three specimens (50 mm×200 mm) are taken from a fiber sheet in a crosswise direction.

(2) An accurate weight (W; unit=g) of each of the specimens is precisely weighed (accuracy up to 0.001 g).

(B) Pretreatment of specimens (1) Into a plastic bottle with a lid, a 1 mol/l hydrochloric acid aqueous solution is added. The amount of the hydrochloric acid aqueous solution is sufficient to completely immerse the specimen in the solution contained in the plastic bottle.

(2) The specimens are thoroughly soaked with pure water, and then loaded in the plastic bottle. The plastic bottle is sealed with the lid.

(3) The plastic bottle is allowed to stand in a thermostatic chamber at 60° C. for 1 hour.

(4) After 1 hour, the specimens are taken from the plastic bottle and rinsed with pure water.

(C) Addition of alkali (1) Each of the specimens pretreated in the above item (B) is crumpled respectively, and loaded into a fresh plastic bottle (100 ml). After 90 ml of pure water is added, 10 ml of a 0.1 mol/l potassium hydroxide standard solution is accurately injected by a pipette. The plastic bottle is then closed with the lid, and lightly shaken.

(2) As blank tests, 90 ml of pure water is added to each of two fresh plastic bottles (100 ml) different from the plastic bottle used in the above item (1) and then 10 ml of a 0.1 mol/l potassium hydroxide standard solution is accurately added by a pipette. The plastic bottles are closed with the lids and lightly shaken.

(3) The plastic bottles of the items (1) and (2) are allowed to stand in a thermostatic chamber at 60° C. for 2 hours.

(4) After 2 hours, the plastic bottles are taken from the thermostatic chamber, and cooled for 20 minutes to an ordinary room temperature.

(D) Titration (1) Only the solution in the plastic bottle containing the specimen is transferred to a beaker. The specimens are left in the plastic bottles in an impregnated state.

(2) The specimens and the inside walls of the plastic bottles are rinsed with pure water, and the wash are also poured into the beaker of item (1).

(3) A few droplets (about two droplets) of a titration indicator, phenolphthalein, are added to the beaker with stirring. The solution turns red.

(4) The solution is titrated by dropwise adding a 0.1 mol/l hydrochloric acid standard solution from a burette.

(5) The value when the solution turns from red to transparent, namely, a titration amount [b (ml)] for the specimens with hydrochloric acid, is recorded.

(6) The procedures of the above items (1) to (5) are repeated for two plastic bottles for blank tests, to obtain a titration amount [c (ml)].

(E) Determination of the potassium-ion-exchangeable capacity (1) The potassium-ion-exchangeable capacity (X: unit= meq/g) is calculated by the equation (2):

$$[X \, (meq/g)] = \{(c-b) \times 0.1\}/W \qquad (2)$$

wherein X is an amount of ions exchanged per a unit weight, b is a titration amount for the specimens with hydrochloric acid, c is a titration amount for the blank tests with hydrochloric acid, and W is a weight of the specimen (g). The capacity is determined from an average value of three specimens, and given to one decimal place.

The graft-polymerization rate of the highly functional fiber sheet for the alkaline battery separator of the present invention is preferably 5 to 20%, more preferably 6 to 16%, most preferably 7 to 15%. When the graft-polymerization rate is less than 5%, the wettability is lowered. When the graft-polymerization rate is more than 20%, an inner pressure is increased, the electrolyte is dried out, and a concentration of potassium ions is decreased.

The "graft-polymerization rate" as used herein is a value defined by the equation (3):

$$G \, (\%) = \{A/(A+B)\} \times 100 \qquad (3)$$

wherein A is a mass of polymers incorporated by a graft-polymerization, B is a dry mass of a fiber sheet prior to the graft-polymerization.

The process for producing the fiber sheet for the alkaline battery separator, particularly the surface-oxidized fiber sheet and the internally highly-carboxylated fiber sheet is not particularly limited but is, for example, a process "A" comprising the steps of:

(1) subjecting a fiber sheet to which a graft-polymerizing liquid containing graft-polymerizable monomers, oligomers, and/or polymers is attached, to a first graft-polymerizing treatment in the presence of oxygen (the step will be referred to as a "graft-polymerizing treatment step "1a"), and then (2) subjecting the fiber sheet to a second graft-polymerizing treatment under the condition that the fiber sheet is surrounded with a gas-nonpermeable film (the step will be referred to as a "graft-polymerizing treatment step "2a").

The process for producing the fiber sheet for the alkaline battery separator, particularly the high ammonia-entrapping fiber sheet, is not particularly limited but is, for example, a process "B" comprising the steps of:

(1) subjecting a fiber sheet to which a graft-polymerizing liquid containing graft-polymerizable monomers, oligomers, and/or polymers and 0.01 to 3 mass % of a surface active agent is attached, to a first graft-polymerizing treatment in the presence of oxygen (the step will be referred to as a "graft-polymerizing treatment step "1b"), and then (2) subjecting the fiber sheet to a second graft-polymerizing treatment under the condition that both sides of the fiber sheet are fully covered with a gas-nonpermeable film (the step will be referred to as a "graft-polymerizing treatment step "2b")

A fiber sheet which may be used as a starting material for the processes "A" and "B", i.e., a fiber sheet to which the graft-polymerizing liquid is not attached (hereinafter referred to as an untreated fiber sheet), may be a nonwoven, woven, or knitted fabric, or combination thereof. Of these fabrics, the untreated fiber sheet preferably contains a nonwoven fabric, more preferably consists essentially of a nonwoven fabric, because the fibers therein can be three-dimensionally disposed and thus the electrolyte-holding capacity is good.

The fiber forming the untreated fiber sheet may be, for example, polyolefin-based fibers, such as polypropylene or polyethylene fibers, polyamide fibers, vinylon fibers, vinylidene fibers, polyvinyl chloride fibers, polyester fibers, acrylic fibers, or polyurethane fibers. Of these fibers, polyolefin-based fiber is preferable to obtain a high alkali resistance.

The untreated fiber sheet may be easily prepared by a conventional method. For example, a suitable nonwoven fabric may be prepared as follows:

A fiber web is prepared from the fibers as mentioned, preferably polyolefin-based fibers, by a wet-laid or dry-laid method, such as a carding method, an air-laid method, a melt-blown method, or a spun-bonding method. A suitable fiber length generally varies with the method used to form a fiber web. For example, short fibers having a fiber length of about 1 to 25 mm are generally used in the wet-laid method, or long fibers having a fiber length of about 25 to 110 mm are generally used in the dry-laid method. The fiber web may be a single layer, or a laminate of different fiber webs, such as a laminate of one or more fiber webs prepared by the wet-laid method and one or more fiber webs prepared by the dry-laid method, or a laminate of fiber webs containing different fiber compositions. Particularly, the laminate of one or more fiber webs prepared by the wet-laid method and one or more fiber webs prepared by the dry-laid method has an evenness stemming from the fiber web prepared by the wet-laid method and a strength stemming from the fiber web prepared by the dry-laid method.

Then the fiber web is bonded to form the nonwoven fabric. As the bonding method, there may be mentioned, for example, (1) a process for entangling the fiber web by a fluid jet, such as a water jet, (2) a process for fusing a whole of or a part of fusible fibers contained as constituent fibers of the fiber web, (3) bonding totally or partially the fiber web with a binder, or (4) a process using a combination of two or more of processes (1) to (3). When one or more fiber webs prepared by the wet-laid method and one or more fiber webs prepared by the dry-laid method are laminated as above, the laminate is preferably entangled by a fluid jet, such as a water jet, to form a substantially single layer wherein the fiber webs prepared by the wet-laid method and the fiber webs prepared by the dry-laid method are not distinguished. Further, when the fiber web contains dividable fibers which can be divided by a mechanical treatment into fine fibers, the dividable fibers can be not only entangled but also divided by a fluid jet. It is preferable to fuse fusible fibers, as a tensile strength and a bending resistance can be thus enhanced.

The graft-polymerizing liquid used in the process "A" contains at least one of graft-polymerizable monomers, oligomers, and/or polymers.

The graft-polymerizing liquid used in the process "B" contains at least one of graft-polymerizable monomers, oligomers, and/or polymers, and 0.01 to 3 mass % of a surface active agent.

The graft-polymerizable monomer which may be used in the processes "A" and "B" of the present invention may be, for example, a vinyl monomer, i.e., a monomer having a carbon-carbon double bond. As an example of the vinyl monomer, there may be mentioned an unsaturated monocarboxylic acid, such as acrylic acid, αethyl acrylic acid, crotonic acid, isocrotonic acid, vinylacetic acid, methacrylic acid, angelic acid, tiglic acid, allylacetic acid, αethyl crotonic acid, cinnamic acid, 10-undecenoic acid, oleic acid, elaidic acid, erucic acid, brassidic acid, lumequeic acid, sorbic acid, linolic acid, eleostearic acid, linolenic acid, arachidonic acid, acetylene carboxylic acid, tetrolic acid, stearolic acid, behenolic acid, or ximenynic acid; a derivative of the above unsaturated monocarboxylic acid, such as an ester; an unsaturated dicarboxylic acid, such as maleic acid, fumaric acid, methylmaleic acid, methylfumaric acid, glutaconic acid, itaconic acid, allylmalonic acid, teraconic acid, muconic acid, or butynedioic acid; a derivative of the above unsaturated dicarboxylic acid, such as an ester; an unsaturated tricarboxylic acid, such as aconitic acid; a derivative of the above unsaturated tricarboxylic acid, such as an ester; a heterocyclic vinyl monomer, such as vinyl pyridine or vinyl pyrolidone; or an aromatic vinyl monomer, such as styrene. When styrene is used as the graft-polymerizable monomer, it is preferable to carry out sulfonation after the graft-polymerizing treatment steps 2a, 2b.

Of these graft-polymerizable monomers, the unsaturated monocarboxylic or dicarboxylic acid containing a carboxyl group on a carbon atom having a double bond is preferable, because it is easily graft-polymerized. Further, acrylic acid or methacrylic acid is more preferable, because a polymerization can be easily controlled, and a good hydrophilic property can be obtained.

The graft-polymerizable oligomers or polymers may be, for example, a polymeric material of the graft-polymerizable monomers as above which can be graft-polymerized to the fiber sheet. In view of reactivity, oligomers or polymers of acrylic acid or oligomers or polymers of methacrylic acid are preferable.

The graft-polymerizable monomers, oligomers, and/or polymers may be attached to the untreated fiber sheet in the processes "A" and "B" of the present invention, for example, by (1) coating the untreated fiber sheet with the solution containing the monomers, oligomers, and/or polymers, (2) spraying the solution containing the monomers, oligomers, and/or polymers onto untreated fiber sheet, or (3) dipping the untreated fiber sheet in a solution containing the monomers, oligomers, and/or polymers.

The graft-polymerizing liquid used in the processes "A" and "B" of the present invention may contain one or more kinds of the graft-polymerizable monomers, oligomers, and polymers.

A concentration of the graft-polymerizable monomers, oligomers, and/or polymers is not particularly limited, but is preferably 5 to 60 mass %, more preferably 10 to 40 mass %, further preferably 15 to 35 mass %, most preferably 20 to 35 mass %. If the concentration of the graft-polymerizable monomers, oligomers, and/or polymers is less than 5 mass %, the electrolyte-holding capacity and the self-discharge inhibitory effect will be lowered. When the concentration of the graft-polymerizable monomers, oligomers, and/or polymers is 10 mass % or more, it becomes easier to prepare the separator having the graft-polymerization rate of 5% or more. If the concentration of the graft-polymerizable monomers, oligomers, and/or polymers is more than 60 mass %, an alkali resistance will be lowered. When the concentration of the graft-polymerizable monomers, oligomers, and/or polymers is 40 mass % or less, it becomes easier to prepare the separator having the graft-polymerization rate of 20% or less.

The surface active agent contained in the graft-polymerizing liquid used in the process "B" of the present invention may be, for example, a nonionic surface active agent, such as polyoxyethylene alkyl ether, polyoxyethylene alkylphenol ether, higher alcohol, or alkyl ethoxylate, or an anionic surface active agent, such as an alkali metal salt of a higher fatty acid, an alkyl sulfonate, or a salt of a sulfosuccinate. In view of a wettability or battery performance, the nonionic surface active agent is preferable, and the higher fatty acid or alkyl ethoxylate is more preferable.

A concentration of the surface active agent contained in the graft-polymerizing liquid used in the process "B" of the present invention is not limited so long as it is within a 0.01 to 3 mass %, but is preferably 0.03 to 3 mass %, more preferably 0.05 to 1 mass %. When the concentration of the surface active agent is less than 0.01 mass %, a wettability of the resulting graft-polymerized fiber sheet to an alkali solution is lowered. When the concentration of the surface active agent is more than 3 mass %, it becomes difficult to prepare a separator capable of entrapping ammonia in an average amount of 0.4 mmol/g or more. Further, an adhesiveness is easily generated, and thus production becomes difficult.

If necessary, the graft-polymerizing liquid used in the processes "A" and "B" of the present invention may contain, for example, a chain transfer agent and/or a reaction initiator.

For example, it is believed that a graft chain may be shortened by adding the chain transfer agent into the graft-polymerizing liquid. Thus, the chain transfer agent is preferable in view of the production procedure, because unreacted monomers may be easily removed by washing. Further, it is preferable to use the graft-polymerizing liquid containing the chain transfer agent in the graft-polymerizing treatment steps 1a, 1b, i.e., the graft-polymerizing treatment in the presence of oxygen, because an excellent self-discharge inhibitory effect may be obtained. When the self-discharge inhibitory effect is excellent, the graft-polymerization rate is lowered, and as a result, the oxidation resistance is enhanced.

As examples of the chain transfer agent, there may be mentioned a lower alcohol, such as isopropyl alcohol, a polyfunctional alcohol, such as polyethylene glycol, or a dicarboxylic acid, such as maleic acid. It is preferable to use polyethylene glycol (more preferable polyethylene glycol having a polymerization degree of 2000 or less) to obtain a good influence on the battery performance. When the polymerization degree of polyethylene glycol is more than 2000, it becomes a solid and is difficult to uniformly disperse. If polyethylene glycol is not uniformly dispersed, the graft-polymerization does not uniformly proceed, and thus, for example, the property for entrapping ammonia is not uniform. The lower limit of the polymerization degree of the polyethylene glycol is about 100, but more preferably, the polymerization degree of polyethylene glycol is 200 to 1000.

A concentration of the chain transfer agent, particularly polyethylene glycol, which may be contained in the graft-polymerizing liquid used in the processes "A" and "B" of the present invention is not limited to, but is preferably 3 to 50 mass %, more preferably 5 to 30 mass %, most preferably 5 to 25 mass %. When the concentration of the chain transfer agent is less than 3 mass %, it becomes difficult to prepare a separator capable of entrapping ammonia in an average amount of 0.4 mmol/g or more. Further, an adhesiveness is easily generated, and thus production becomes difficult. When the concentration of the chain transfer agent is more than 50 mass %, the graft-polymerization rate and the amount of ammonia entrapped will be lowered.

The reaction initiator contained in the graft-polymerizing liquid used for the processes "A" and "B" of the present invention may be, for example, benzophenone, a peroxide, such as benzoyl peroxide, or an azo compound. In view of the battery performance, benzophenone is preferable.

A concentration of the reaction initiator, particularly benzophenone, which may be contained in the graft-polymerizing liquid used for the processes "A" and "B" of the present invention is not particularly limited, but is preferably 0.05 to 1 mass %, more preferably 0.05 to 0.5 mass %, most preferably 0.05 to 0.3 mass %. When the concentration of the reaction initiator is less than 0.05 mass %, the graft-polymerization will not sufficiently proceed. When the concentration of the reaction initiator is more than 1 mass %, it becomes difficult to prepare a separator capable of entrapping ammonia in an amount of 0.4 mmol/g or more in average.

A solvent or a suspension medium for the graft-polymerizing liquid used for the processes "A" and "B" of the present invention is not particularly limited, but may be, for example, water, alcohol or acetone.

If necessary, the graft-polymerizing liquid may further contain an inhibitory agent for generating a homopolymer, such as iron sulfate.

When a superfluous graft-polymerizing liquid is attached to the untreated fiber sheet, the graft-polymerizing liquid is unevenly distributed by an action of the gravitational force, and as a result, the graft-polymerization proceeds unevenly. Thus it is preferable to remove superfluous graft-polymerizing liquid. An amount of the graft-polymerizing liquid attached to the untreated fiber sheet is preferably 40 to 250 g/m$^2$, more preferably 50 to 200 g/m$^2$, with respect to 100 g/m$^2$ of an area density of the untreated fiber sheet. The superfluous graft-polymerizing liquid may be removed by, for example, passing the untreated fiber sheet through a pair of rolls or flat presses.

Before the graft-polymerizing liquid is attached to the untreated fiber sheet, it is preferable to treat the surface of the untreated fiber sheet by an irradiation of ultraviolet light, a corona-discharge, and/or a plasma discharge, to improve an affinity between the graft-polymerizing liquid and the untreated fiber sheet.

In the graft-polymerizing treatment steps 1a, 1b of the processes "A" and "B" of the present invention, the first graft-polymerization is carried out in the presence of oxygen. Oxygen present in the graft-polymerizing treatment steps 1a, 1b may be air, oxygen gas or the like. The graft-polymerizing treatment steps 1a, 1b may be carried out in air, or while supplying oxygen. It is preferable to carry out the steps in air, because this procedure is easy; namely, a concentration of oxygen may be easily controlled at a constant level.

The graft-polymerization in the graft-polymerizing treatment steps 1a, 1b may be carried out, for example, by an irradiation of ultraviolet light, far infrared rays, X-rays, $\alpha$-rays, $\beta$-rays, or $\gamma$-rays, or a thermal polymerization. Of these methods, it is preferable to carry out the irradiation of ultraviolet light, because the graft-polymerization can be carried out only on the fiber surfaces, a time necessary to generate radicals of the reaction initiator is short, and the graft-polymerization can be carried out in a short time.

In the graft-polymerizing treatment step 1a of the process "A" of the present invention, the graft-polymerization of the monomers, oligomers, and/or polymers proceeds, and at the same time, a reaction to adsorb the substance having a peak of a bond energy at 530.5 to 531.5 eV, which is believed to be oxygen atoms and/or oxygen molecules, to the outer surfaces of the fibers forming a surface of the untreated fiber sheet also proceeds. As a result, it is believed that an oxidation resistance of the separator can be enhanced. Even if the graft-polymerizable monomers, oligomers, and/or polymers containing carboxyl groups are used, the carboxyl group, if any, exists in a small amount or rarely exists on the outer surfaces of fibers forming a surface of the untreated fiber sheet. Therefore, it is believed that an oxidation resistance of the separator may be enhanced.

In the graft-polymerizing treatment steps 1a, 1b, the first graft-polymerization can be carried out to the extent that the graft-polymerizing liquid is not completely evaporated. The time of the first graft-polymerization in the graft-polymerizing treatment steps 1a, 1b can be appropriately determined in accordance with the graft-polymerizing method, graft-polymerizing conditions, such as an irradiation strength, the graft-polymerization rate, or the amount of ammonia entrapped.

In the graft-polymerizing treatment steps 2a, 2b of the processes "A" and "B" of the present invention, a hydrophilic property is imparted to the first graft-polymerized fiber sheet by surrounding the first graft-polymerized fiber sheet with one or more gas-nonpermeable films (the graft-polymerizing treatment step 2a), or covering all the surfaces of both sides of the first graft-polymerized fiber sheet with one or more gas-nonpermeable films (the graft-polymerizing treatment step 2b), and carrying out the second graft-polymerization.

The monomers, oligomers, and/or polymers carried on the first graft-polymerized fiber sheet may be prevented from further dispersion by surrounding the first graft-polymerized fiber sheet with the gas-nonpermeable film. It is believed that, in the graft-polymerizing treatment steps 2a, 2b, graft chains formed by the first graft-polymerization in the presence of oxygen are graft-polymerized and extended. Therefore, the second graft-polymerization proceeds more easily on the surfaces of fibers forming the inside of the first graft-polymerized fiber sheet, in comparison with the outer surfaces of the fibers forming the surface of the first graft-polymerized fiber sheet. When the monomers, oligomers, and/or polymers having carboxyl groups are used, many carboxyl groups are bonded to the surfaces of the fibers forming the inside of the first graft-polymerized fiber sheet. It is believed that an adsorbing reaction of oxygen atoms and/or oxygen molecules to the fibers forming the outer surface of the first graft-polymerized fiber sheet also further proceeds.

In the graft-polymerizing treatment step 2b, diffusion of monomers, oligomers, and/or polymers evaporated from the first graft-polymerized fiber sheet can be prevented by covering all the surfaces of both sides of the first graft-polymerized fiber sheet with one or more gas-nonpermeable films.

The gas-nonpermeable film used in the graft-polymerizing treatment steps 2a, 2b is not particularly limited, so long as a gas, particularly vapor of the graft-polymerizing liquid, does not permeate the film. However, it is preferable to use a polyolefin-based film, such as a polyethylene film or a polypropylene film, because it has a high degree of light transmission, for example, 80% or more, at an absorption wavelength of the reaction initiator. If the degree of light transmission is low at an absorption wavelength of the reaction initiator, the graft-polymerization process is inhibited.

In the graft-polymerizing treatment step 2b, the whole areas of both sides of the first graft-polymerized fiber sheet are fully covered with the gas-nonpermeable film, so that a pressure is not applied to both sides of the first graft-polymerized fiber sheet, and thus air can exist within inner spaces and the spaces around the outer surfaces of the first graft-polymerized fiber sheet. Therefore, the graft-polymerizing treatment step 2b is carried out in the presence of oxygen.

In the graft-polymerizing treatment step 2b, the edges and areas near thereto may be covered with the gas-nonpermeable film, i.e., a gas-nonpermeable film covering the upper side of the first graft-polymerized fiber sheet and a gas-nonpermeable film covering the lower side of the first graft-polymerized fiber sheet are continuous. Alternatively, the edges and areas near thereto may not be covered with the gas-nonpermeable film, i.e., a gas-nonpermeable film covering the upper side of the first graft-polymerized fiber sheet and a gas-nonpermeable film covering the lower side of the first graft-polymerized fiber sheet are separated from each other.

The graft-polymerizing treatment steps 2a, 2b are carried out preferably at 100° C. or more, more preferably at 110° C. or more. The highly functional fiber sheet (separator) having a high oxidation resistance and capable of entrapping ammonia in an average amount of 0.4 mmol/g or more can be easily obtained by carrying out the second graft-polymerizing treatment steps 2a, 2b at an elevated temperature.

The graft-polymerization in the graft-polymerizing treatment steps 2a, 2b may be carried out, for example, by an irradiation of ultraviolet light, far infrared rays, X-rays, $\alpha$-rays, $\beta$-rays, or $\gamma$-rays, or a thermal polymerization. The graft-polymerization in the graft-polymerizing treatment steps 2a, 2b may be carried out as in the graft-polymerization in the graft-polymerizing treatment steps 1a, 1b. The conditions used in the first graft-polymerization in the graft-polymerizing treatment steps 1a, 1b (the graft-polymerization in the presence of oxygen) may be same as or different from those used in the second graft-polymerization in the graft-polymerizing treatment steps 2a, 2b (the graft-polymerization while surrounded or covered with the gas-nonpermeable film), except for the condition that the first graft-polymerized fiber sheet is, or is not, surrounded or covered with the gas-nonpermeable film.

For example, the second graft-polymerization in the graft-polymerizing treatment step 2b can be carried out until the fiber sheet capable of entrapping ammonia in an average amount of 0.4 mmol/g or more, preferably 0.45 mmol/g or more, more preferably 0.5 mmol/g or more, can be obtained. The time of the second graft-polymerization in the graft-polymerizing treatment steps 2a, 2b can be appropriately determined in accordance with the graft-polymerizing method, graft-polymerizing conditions, such as an irradiation strength, the graft-polymerization rate, or the amount of ammonia entrapped.

The ratio (A:B) of the treatment time (A) of the graft-polymerizing treatment steps 1a, 1b and the treatment time (B) of the graft-polymerizing treatment steps 2a, 2b is not particularly limited but is preferably 1:8 to 5:4, more preferably 2:7 to 5:4. When the ratio of the treatment time (A) of the graft-polymerizing treatment steps 1a, 1b and the treatment time (B) of the graft-polymerizing treatment steps 2a, 2b is less than 1:8, the amount of the substance having the peak of a bond energy at 530.5 to 531.5 eV on the outer surfaces of the fibers forming the surface of the fiber sheet (separator) will be reduced, the oxidation resistance will be lowered, and the amount of ammonia entrapped will be lowered. When the ratio of the treatment time (A) of the graft-polymerizing treatment steps 1a, 1b and the treatment time (B) of the graft-polymerizing treatment steps 2a, 2b is more than 5:4, the graft-polymerization process will be inhibited, the electrolyte-holding capacity will be lowered, the self-discharge will not be properly inhibited, and thus the capacity-maintaining rate will be lowered.

It is preferable to thoroughly wash the fiber sheet obtained by carrying out the first and second graft-polymerizations with, for example, water, warm water, hot water, or alcohol, because the fiber sheet obtained by carrying out the first and second graft-polymerizations contains more or less unreacted materials, such as monomers, oligomers, and/or polymers.

The fiber sheet obtained by carrying out the first and second graft-polymerizations may be treated by a conventional treatment to impart a hydrophilicity, such as a treatment with a surface active agent, a treatment with a gas mixture of fluorine gas diluted with inert gas (such as nitrogen gas) and at least a gas selected from the group consisting of oxygen gas, carbon dioxide gas and sulfur dioxide gas, or a discharging treatment to enable a rapid pouring of electrolyte, and enhance the productivity of the battery.

In the treatment with a surface active agent, it is preferable to attach the surface active agent in an amount of preferably 0.1 to 3 mass %., more preferably 0.2 to 1.5 mass %, most preferably 0.3 to 1.2 mass % with respect to the mass of the separator.

The alkaline battery separator containing the surface-oxidized fiber sheet of the present invention is not susceptible to oxygen generated in the battery, and exhibits a high oxidation resistance and an excellent self-discharge inhibition effect. The alkaline battery separator containing the internally highly-carboxylated fiber sheet of the present invention also is not susceptible to oxygen generated in the battery, and exhibits a high oxidation resistance and an excellent self-discharge inhibition effect. Further, the alkaline battery separator containing the highly ammonia-entrapping fiber sheet of the present invention exhibits an excellent self-discharge inhibition effect, an excellent wettability, and an excellent consistency in the rate of capacity maintained.

Accordingly, the alkaline battery separator of the present invention may be preferably used in a nickel-cadmium or nickel-hydrogen battery wherein oxygen is generated upon overcharging. Further, the alkaline battery separator of the present invention may be preferably used in other alkaline batteries, for example, an alkaline primary battery, such as an alkaline-manganese battery, a mercury battery, a silver oxide battery, or an air battery, or an alkaline secondary battery, such as a silver-zinc battery, a silver-cadmium battery, a nickel-zinc battery, or a chargeable alkaline-manganese battery.

EXAMPLES

The present invention will now be further illustrated by, but is by no means limited to, the following Examples.

In the-Examples, the outer surfaces of the fibers forming the surface of the separator and the surfaces of the fibers forming the inside of the separator were measured by an X-rays microanalyzer as follows:

(1) The separator was dipped in 1N hydrochloric acid aqueous solution for 2 hours.

(2) After a thorough rinsing with water, the separator was dipped in a 1N potassium hydroxide aqueous solution for 2 hours, to replace hydrogen with potassium.

(3) The separator was thoroughly rinsed with water and dried.

(4) Potassium was measured by an energy-dispersing type X-ray microanalyzer.

Examples 1

A fiber web was formed from a slurry prepared by dispersing 100 mass % of sheath-core type fusible fibers (fineness=1.2 dtex; fiber length=10 mm; high-density polyethylene accounting for 100% of the fiber surface) containing a polypropylene core component and a high-density polyethylene sheath component (melting point=132° C.) by a conventional wet-laid method. Then, the fiber web was heat treated at 136° C., and passed through rolls under a linear pressure of 10 N/cm, to fuse the high-density polyethylene sheath component in the sheath-core type fusible fibers and form an untreated nonwoven fabric (area density= 55.4 g/m$^2$).

A graft-polymerizing liquid was prepared from the following ingredients:

| | ingredients | mass % |
|---|---|---|
| (1) | acrylic acid monomer | 25 |
| (2) | benzophenone | 0.3 |
| (3) | iron sulfate | 0.4 |
| (4) | nonionic surface active agent | 3 |
| (5) | water | 71.3 |

Then the untreated nonwoven fabric was dipped in the graft-polymerizing liquid and was impregnated with the graft-polymerizing liquid in a ratio of 80 g/m$^2$ with respect to 100 g/m$^2$ of the area density of the nonwoven fabric. The nonwoven fabric was irradiated in air for 15 seconds with ultraviolet light having a central wavelength of 365 nm at a light intensity of 180 mW/cm$^2$, by a metal halide mercury vapor lamp located on both sides of the nonwoven fabric respectively, to thereby graft-polymerize acrylic acids. Thereafter, the first graft-polymerized nonwoven fabric was sandwiched between two gas-nonpermeable films so that air remaining in the inner spaces and the spaces around the outer surfaces of the first graft-polymerized nonwoven fabric could not escape. The first graft-polymerized nonwoven fabric was irradiated for 15 seconds with ultraviolet light having a central wavelength of 365 nm at a light intensity of 180 mW/cm$^2$, by a metal halide mercury vapor lamp located on both sides of the first graft-polymerized nonwoven fabric respectively, to further graft-polymerize acrylic acids onto the previously formed graft-polymers. When the second graft-polymerization was carried out, the temperature of first graft-polymerized nonwoven fabric was 110° C., and the graft-polymerizing liquid was able to evaporate and diffuse from the edges of two gas-nonpermeable films. Then the graft-polymerized nonwoven fabric was thoroughly rinsed with water, dried, and calendered under a linear pressure of 10 N/cm to obtain a separator (area density=60.8 g/cm$^2$ thickness=0.15 mm graft-polymerization rate=9.8%).

Figure 2:
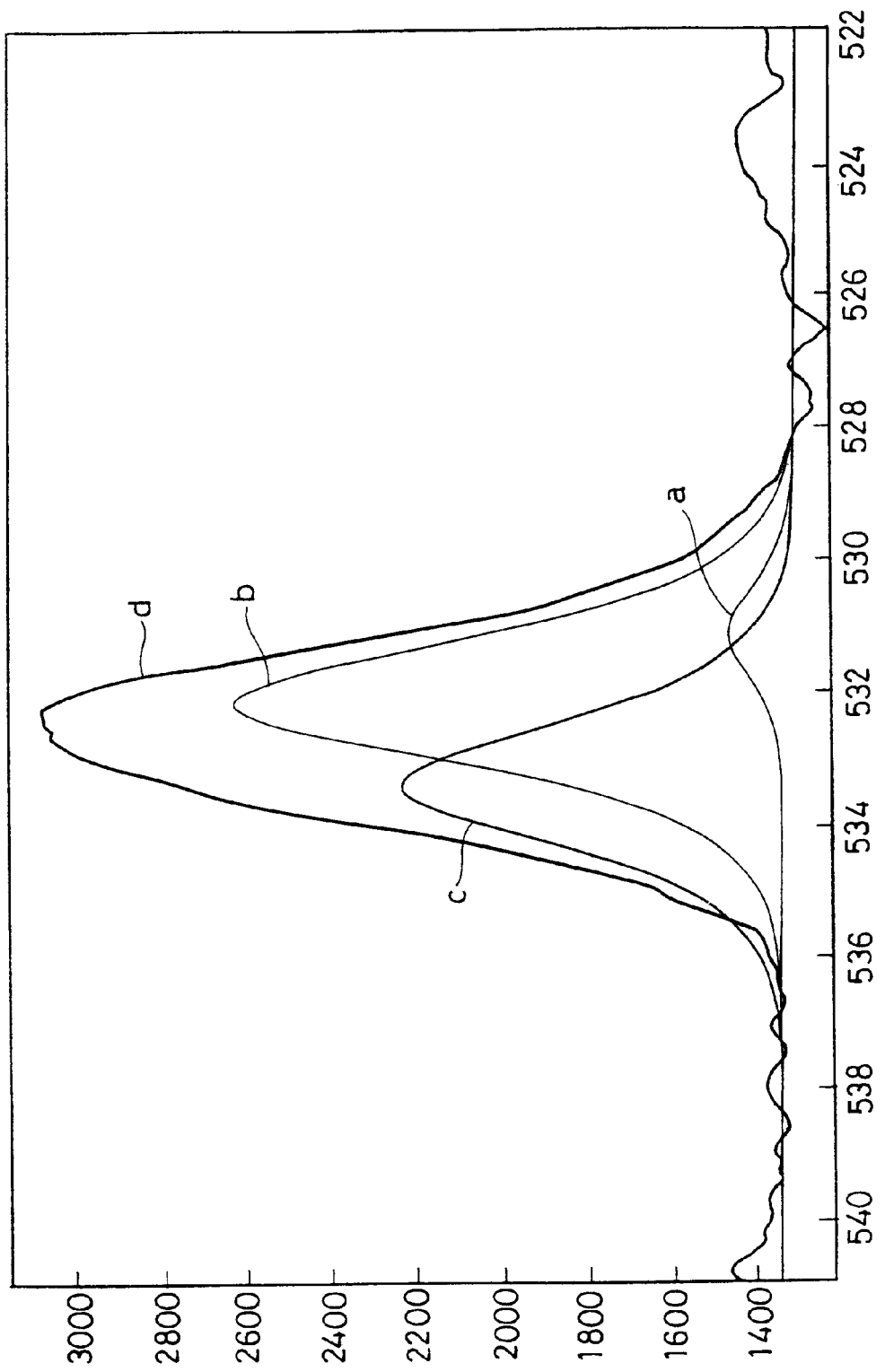
FIG. 2 is a chart obtained by measuring the outer surfaces of the fibers which form a surface of a separator prepared in Example 1 by an X-ray photoelectron spectrometer at a photoelectron-taking-off angle of about 30°.

The outer surfaces of the fibers forming the separator surface were measured by an X-ray photoelectron spectrometer at a generated photoelectron-taking-off angle of 30°, and the substance having the peak of a bond energy at 530.5 to 531.5 eV was detected as shown in FIG. 2. In FIG. 2, the curve a is a peak-line-shape-separated spectrum stemming from O or O$_2$, the curve b is a peak-line-shape-separated spectrum stemming from C=O or O—C=O, the curve c is a peak-line-shape-separated spectrum stemming from C—O, and the curve d is an O$_{1s}$ spectrum. The curves a to c are spectra obtained by a peak line shape analysis and peak separation according to the Gauss/Lorentzian mixed function to analyze functional groups present in the O$_{1s}$ spectrum (the curve d).

The outer surfaces of the fibers forming the separator surface were measured by an X-ray photoelectron spectrometer at a generated photoelectron-taking-off angle of 90°, but no substance having the peak of a bond energy at 530.5 to 531.5 eV was detected.

The outer surfaces of the fibers forming the separator surface and the surfaces of the fibers forming the separator inside were measured by an X-ray microanalyzer. No carboxyl group was detected on the surface region, but carboxyl groups were detected in the inside region.

Comparative Example 1

An untreated nonwoven fabric was prepared as in Example 1, and dipped in the graft-polymerizing liquid used in Example 1. The nonwoven fabric was impregnated with the graft-polymerizing liquid in a ratio of 80 g/m$^2$ with respect to 100 g/m$^2$ of the area density of the nonwoven fabric. The nonwoven fabric was sandwiched between two gas-nonpermeable films, and irradiated for 30 seconds with ultraviolet light having a central wavelength of 365 nm at a light intensity of 180 mW/cm$^2$, by a metal halide mercury vapor lamp located on both sides of the nonwoven fabric respectively, to thereby graft-polymerize acrylic acids. Then, the graft-polymerized nonwoven fabric was thoroughly rinsed with water, dried, and calendered under a linear pressure of 10 N/cm to obtain a separator (area density=59.8 g/m$^2$ thickness=0.15 mm graft-polymerization rate=10.5%).

Figure 3:
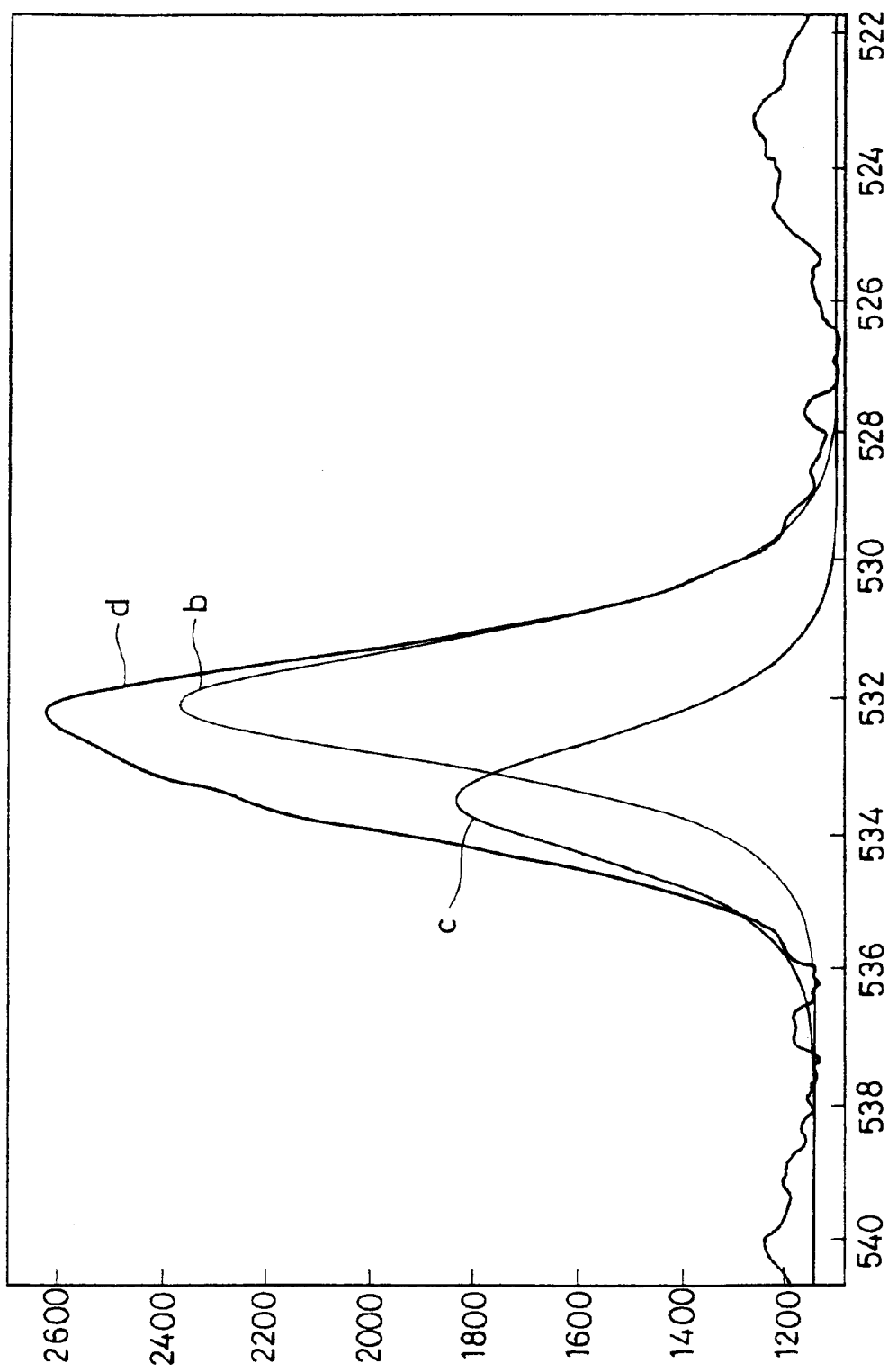
FIG. 3 is a chart obtained by measuring the outer surfaces of the fibers which form a surface of a separator prepared in Comparative Example 1 by an X-ray photoelectron spectrometer at a photoelectron-taking-off angle of about 30°.

The outer surfaces of the fibers forming the separator surface were measured by an X-ray photoelectron spectrometer at a generated photoelectron-taking-off angle of 30°, and no substance having the peak of a bond energy at 530.5 to 531.5 eV was detected, as shown in FIG. 3. That is, a peak-line-shape-separated spectrum stemming from O or O$_2$ was not obtained. In FIG. 3, the curves b, c, d have the same meaning as in FIG. 2.

The outer surfaces of the fibers forming the separator surface and the surfaces of the fibers forming the separator inside were measured by an X-ray microanalyzer, and carboxyl groups were detected on the surface region and the inside region to a similar extent.

Example 2

A fiber web was formed from a slurry prepared by mixing and dispersing 70 mass % of orange-type dividable fibers (fineness=2.2 dtex fiber length=10 mm; dividable by a water jet into 8 polypropylene fine fibers having a fineness of 0.138 dtex, and 8 high-density polyethylene fine fibers having a fineness of 0.138 dtex) containing polypropylene components (sectional shapes=sector; melting point=160° C.) and high-density polyethylene components (sectional shapes=sector; melting point=130° C.) and 30 mass % of sheath-core type fusible fibers (fineness=2.2 dtex fiber length=10 mm) containing a polypropylene core component and a low-density polyethylene sheath component (melting point 110° C.) by a conventional wet-laid method.

Then, the fiber web was heat-treated at 115° C. to fuse only the low-density polyethylene component in the sheath-core type fusible fibers. After the fused fiber web was mounted on a net (100 mesh), a water jet was alternately applied twice to both sides of the fused fiber web, from a nozzle plate containing nozzles having a diameter of 0.13 mm and a pitch of 0.6 mm under a pressure of 12.7 MPa, to divide dividable fibers. Then, the divided fiber web was heat-treated at 115° C. to again fuse only the low-density polyethylene component in the sheath-core type fusible fibers, to obtain an untreated nonwoven fabric. Thereafter, graft-polymerizations were carried out as in Example 1. The graft-polymerized nonwoven fabric was thoroughly rinsed with water, dried, and calendered under a linear pressure of 10 N/cm to obtain a separator (area density=60.5 g/m$^2$ thickness=0.15 mm, graft-polymerization rate=10%).

The outer surfaces of the fibers forming the separator surface were measured by an X-ray photoelectron spectrometer at a generated photoelectron-taking-off angle of 30°, and the substance having the peak of a bond energy at 530.5 to 531.5 eV was detected. The outer surfaces of the fibers forming the separator surface were measured by an X-ray photoelectron spectrometer at a generated photoelectron-taking-off angle of 90°, but no substance having the peak of a bond energy at 530.5 to 531.5 eV was detected.

The outer surfaces of the fibers forming the separator surface and the surfaces of the fibers forming the separator inside were measured by an X-ray microanalyzer. No carboxyl group was detected on the surface region, but carboxyl groups were detected in the inside region.

Example 3

A fiber web (area density=35 g/m$^2$) from a wet-laid method was prepared as in Example 2. A parallel-laid fiber web (area density=20 g/m$^2$) was prepared by mixing and carding 70 mass % of the same dividable fibers as those used in Example 2 except that the fiber length was 38 mm, and 30 mass % of the same sheath-core type fusible fibers as those used in Example 2 except that the fiber length was 38 mm, by a carding apparatus. Then, the wet-laid fiber web and the parallel-laid fiber web were laminated to form a laminated fiber web.

Thereafter, the laminated fiber web was treated as in Example 2, i.e., the fusion of only the low-density polyethylene component of the sheath-core type fusible fibers, division of the dividable fibers with a water jet, and the second fusion of the low-density polyethylene component of the sheath-core type fusible fibers were carried out in this sequential order to obtain an untreated nonwoven fabric wherein short fibers and long fibers were uniformly entangled as a single layer. Thereafter, graft-polymerizations were carried out as in Example 1, and the graft-polymerized nonwoven fabric was thoroughly rinsed with water, dried, and calendered under a linear pressure of 10 N/cm to obtain a separator (area density=59.2 g/m$^2$ thickness=0.15 mm graft-polymerization rate=10.2%).

The outer surfaces of the fibers forming the separator surface were measured by an X-ray photoelectron spectrometer at a generated photoelectron-taking-off angle of 30°, and the substance having the peak of a bond energy at 530.5 to 531.5 eV was detected. The outer surfaces of the fibers forming the separator surface were measured by an X-ray photoelectron spectrometer at a generated photoelectron-taking-off angle of 90°, but no substance having the peak of a bond energy at 530.5 to 531.5 eV was detected.

The outer surfaces of the fibers forming the separator surface and the surfaces of the fibers forming the separator inside were measured by an X-ray microanalyzer. No carboxyl group was detected on the surface region, but carboxyl groups were detected in the inside region.

Example 4

A graft-polymerizing liquid was prepared from the following ingredients.

|     | ingredients | mass % |
| --- | --- | --- |
| (1) | acrylic acid monomer: | 25 |
| (2) | benzophenone: | 0.3 |
| (3) | iron sulfate: | 0.4 |
| (4) | nonionic surface active agent: | 3 |
| (5) | water: | 61.3 |
| (6) | polyethylene glycol (polymerization degree: 400): | 10 |

Thereafter, the procedure of Example 1 was repeated except that the above graft-polymerizing liquid was used.

Namely, graft-polymerizations were carried out as in Example 1, and the graft-polymerized nonwoven fabric was thoroughly rinsed with water, dried, and calendered under a linear pressure of 10 N/cm to obtain a separator (area density=60.3 g/m² thickness=0.15 mm graft-polymerization rate=9.9%).

The outer surfaces of the fibers forming the separator surface were measured by an X-ray photoelectron spectrometer at a generated photoelectron-taking-off angle of 30°, and the substance having the peak of a bond energy at 530.5 to 531.5 eV was detected. The outer surfaces of the fibers forming the separator surface were measured by an X-ray photoelectron spectrometer at a generated photoelectron-taking-off angle of 90°, and the substance having the peak of a bond energy at 530.5 to 531.5 eV was detected in an amount less than that detected at a generated photoelectron-taking-off angle of 30°.

The outer surfaces of the fibers forming the separator surface and the surfaces of the fibers forming the separator inside were measured by an X-ray microanalyzer. No carboxyl group was detected on the surface region, but carboxyl groups were detected in the inside region.

Comparative Example 2

An untreated nonwoven fabric was prepared as in Example 1, and dipped in the graft-polymerizing liquid used in Example 4. The nonwoven fabric was impregnated with the graft-polymerizing liquid in a ratio of 80 g/m² with respect to 100 g/m² of the area density of the nonwoven fabric. The nonwoven fabric was sandwiched between two gas-nonpermeable films, and irradiated for 30 seconds with ultraviolet light having a central wavelength of 365 nm at a light intensity of 180 mW/cm², by a metal halide mercury vapor lamp located on both sides of the nonwoven fabric respectively, to thereby graft-polymerize acrylic acids. Then the graft-polymerized nonwoven fabric was thoroughly rinsed with water, dried, and calendered under a linear pressure of 10 N/cm to obtain a separator (area density=60 g/m² thickness=0.15 mm, graft-polymerization rate=11%).

The outer surfaces of the fibers forming the separator surface were measured by an X-ray photoelectron spectrometer at a generated photoelectron-taking-off angle of 30°, but no substance having the peak of a bond energy at 530.5 to 531.5 eV was detected.

The outer surfaces of the fibers forming the separator surface and the surfaces of the fibers forming the separator inside were measured by an X-ray microanalyzer, and carboxyl groups were detected on the surface region and the inside region to a similar extent.

Example 5

A graft-polymerizing liquid was prepared from the following ingredients.

|   | ingredients | mass % |
|---|---|---|
| (1) | acrylic acid monomer: | 25 |
| (2) | benzophenone: | 0.3 |
| (3) | iron sulfate: | 0.4 |
| (4) | nonionic surface active agent: | 3 |
| (5) | water: | 51.3 |
| (6) | isopropyl alcohol: | 20 |

Thereafter, the procedure of Example 1 was repeated except that the above graft-polymerizing liquid was used. Namely, graft-polymerizations were carried out as in Example 1, and the graft-polymerized nonwoven fabric was thoroughly rinsed with water, dried, and calendered under a linear pressure of 10 N/cm to obtain a separator (area density=60.4 g/m², thickness=0.15 mm, graft-polymerization rate=9.8%).

The outer surfaces of the fibers forming the separator surface were measured by an X-ray photoelectron spectrometer at a generated photoelectron-taking-off angle of 30°, and the substance having the peak of a bond energy at 530.5 to 531.5 eV was detected. The outer surfaces of the fibers forming the separator surface were measured by an X-ray photoelectron spectrometer at a generated photoelectron-taking-off angle of 90°, and the substance having the peak of a bond energy at 530.5 to 531.5 eV was detected in an amount less than that detected at a generated photoelectron-taking-off angle of 30°.

The outer surfaces of the fibers forming the separator surface and the surfaces of the fibers forming the separator inside were measured by an X-ray microanalyzer. No carboxyl group was detected on the surface region, but carboxyl groups were detected in the inside region.

Example 6

A graft-polymerizing liquid was prepared from the following ingredients.

|   | ingredients | mass % |
|---|---|---|
| (1) | acrylic acid monomer: | 25 |
| (2) | benzophenone: | 0.3 |
| (3) | iron sulfate: | 0.4 |
| (4) | nonionic surface active agent: | 3 |
| (5) | water: | 61.3 |
| (6) | maleic acid: | 10 |

Thereafter, the procedure of Example 1 was repeated except that the above graft-polymerizing liquid was used. Namely, graft-polymerizations were carried out as in Example 1, and the graft-polymerized nonwoven fabric was thoroughly rinsed with water, dried, and calendered under a linear pressure of 10 N/cm to obtain a separator (area density=59.2 g/m², thickness=0.15 mm, graft-polymerization rate=9.2%).

The outer surfaces of the fibers forming the separator surface were measured by an X-ray photoelectron spectrometer at a generated photoelectron-taking-off angle of 30°, and the substance having the peak of a bond energy at 530.5 to 531.5 eV was detected. The outer surfaces of the fibers forming the separator surface were measured by an X-ray photoelectron spectrometer at a generated photoelectron-taking-off angle of 90°, and the substance having the peak of a bond energy at 530.5 to 531.5 eV was detected in an amount less than that detected at a generated photoelectron-taking-off angle of 30°.

The outer surfaces of the fibers forming the separator surface and the surfaces of the fibers forming the separator inside were measured by an X-ray microanalyzer. No carboxyl group was detected on the surface region, but carboxyl groups were detected in the inside region.

Example 7

A fiber web was formed from a slurry prepared by dispersing 80 mass % of sheath-core type fusible fibers (fineness=0.77 dtex fiber length=5 mm) containing a polypropylene core component and high-density polyethylene (melting point=132° C.) and 20 mass % of high-strength polypropylene fibers (fineness=2.2 dtex, fiber length=10 mm, tensile strength=8 cN/dtex) by a conventional wet-laid method. Then the fiber web was heat-treated at 136° C., and passed through rolls at an ordinary room temperature under a linear pressure of 10 N/cm, to fuse the high-density polyethylene sheath component in the sheath-core type fusible fibers and form an untreated nonwoven fabric.

A graft-polymerizing liquid was prepared from the following ingredients:

|   | ingredients | mass % |
|---|---|---|
| (1) | acrylic acid monomer: | 30 |
| (2) | benzophenone: | 0.1 |
| (3) | iron sulfate: | 0.4 |
| (4) | nonionic surface active agent: | 1 |
| (5) | polyethylene glycol (polymerization degree: 400): | 10 |
| (6) | water: | 58.5 |

Then the untreated nonwoven fabric was dipped in the graft-polymerizing liquid and was impregnated with the graft-polymerizing liquid in a ratio of 80 g/m$^2$ with respect to 100 g/m$^2$ of the area density of the nonwoven fabric. The nonwoven fabric was irradiated in air for 15 seconds with ultraviolet light having a central wavelength of 365 nm at a light intensity of 180 mW/cm$^2$, by a metal halide mercury vapor lamp located on both sides of the nonwoven fabric respectively, to thereby graft-polymerize acrylic acids.

The acrylic acids were not graft-polymerized to the fibers present on the surface layer of the first graft-polymerized nonwoven fabric, whereas the acrylic acids were graft-polymerized to the fibers present in the inner portion of the first graft-polymerized nonwoven fabric.

Thereafter, the first graft-polymerized nonwoven fabric was sandwiched between two gas-nonpermeable films without applying pressure to both sides of the nonwoven fabric so that air remaining in the inner spaces of the nonwoven fabric could not escape. The first graft-polymerized nonwoven fabric was irradiated for 16 seconds with ultraviolet light having a central wavelength of 365 nm at a light intensity of 180 mW/cm$^2$, by a metal halide mercury vapor lamp located on both sides of the nonwoven fabric respectively to further graft-polymerize acrylic acids onto the previously formed graft-polymers. Then the graft-polymerized nonwoven fabric was thoroughly rinsed with water, dried, and calendered under a linear pressure of 10 N/cm to obtain a separator (area density=60.8 g/m$^2$ thickness 0.15 mm, graft-polymerization rate=9.8%).

The outer surfaces of the fibers forming the separator surface were measured by an X-ray photoelectron spectrometer at a generated photoelectron-taking-off angle of 30°, and the substance having the peak of a bond energy at 530.5 to 531.5 eV was detected.

The outer surfaces of the fibers forming the separator surface were measured by an X-ray photoelectron spectrometer at a generated photoelectron-taking-off angle of 90°, but no substance having the peak of a bond energy at 530.5 to 531.5 eV was detected.

The outer surfaces of the fibers forming the separator surface and the surfaces of the fibers forming the separator inside were measured by an X-rays microanalyzer. No carboxyl group was detected on the surface region, but carboxyl groups were detected in the inside region.

Example 8

A fiber web was formed from a slurry prepared by dispersing 80 mass % of sheath-core type fusible fibers (fineness=0.8 dtex, fiber length=5 mm) containing a polypropylene core component and high-density polyethylene (melting point=132° C.) and 20 mass % of high-strength polypropylene fibers (fineness=2.2 dtex, fiber length=10 mm, tensile strength=8 cN/dtex) by a conventional wet-laid method. Then the fiber web was heat-treated at 136° C., and passed through rolls at an ordinary room temperature under a linear pressure of 10 N/cm to fuse the high-density polyethylene sheath component in the sheath-core type fusible fibers and form an untreated nonwoven fabric.

A graft-polymerizing liquid was prepared from the following ingredients (1) to (6):

|   | ingredients | mass % |
|---|---|---|
| (1) | acrylic acid monomer | 30 |
| (2) | benzophenone | 0.1 |
| (3) | iron sulfate | 0.4 |
| (4) | nonionic surface active agent | 0.5 |
| (5) | polyethylene glycol (polymerization degree: 400) | 10 |
| (6) | water | 59 |

Iron sulfate was added as a agent to inhibit any generation of a homopolymer.

Then the untreated nonwoven fabric was dipped in the graft-polymerizing liquid and was impregnated with the graft-polymerizing liquid in a ratio of 80 g/m$^2$ with respect to 100 g/m$^2$ of the area density of the nonwoven fabric. The nonwoven fabric was irradiated in air for 15 seconds with ultraviolet light having a central wavelength of 365 nm at a light intensity of 180 mW/cm$^2$, by a metal halide mercury vapor lamp located on both sides of the nonwoven fabric respectively to thereby graft-polymerize acrylic acids. Thereafter, the nonwoven fabric was sandwiched between two gas-nonpermeable films so that air in the inner spaces and the spaces around of the outer surfaces of the first graft-polymerized nonwoven fabric could not escape. The nonwoven fabric was irradiated for 15 seconds with ultraviolet light having a central wavelength of 365 nm at a light intensity of 180 mW/cm$^2$, by a metal halide mercury vapor lamp located on both sides of the nonwoven fabric respectively, to further graft-polymerize acrylic acids onto the previously formed graft-polymers. When the second graft-polymerization was carried out, the temperature of nonwoven fabric was 10° C., and the graft-polymerizing liquid was able to evaporate and diffuse from the edges of two gas-nonpermeable films. Then the graft-polymerized nonwoven fabric was thoroughly rinsed with water, dried, and calendered under a linear pressure of 10 N/cm to obtain a separator (area density=60.8 g/m$^2$, thickness=0.15 mm, graft-polymerization rate=9.8%).

Example 9

The procedures in Example 8 were repeated, except for using the graft-polymerizing liquid prepared from the following ingredients, to obtain the separator of the present invention (area density=60.8 g/m$^2$, thickness=0.15 mm, graft-polymerization rate=9.8%).

| | ingredients | mass % |
|---|---|---|
| (1) | acrylic acid monomer | 30 |
| (2) | benzophenone | 0.1 |
| (3) | iron sulfate | 0.4 |
| (4) | nonionic surface active agent | 0.1 |
| (5) | polyethylene glycol (polymerization degree: 400) | 10 |
| (6) | water | 59.4 |

Example 10

The procedures in Example 8 were repeated, except for using the graft-polymerizing liquid prepared from the following ingredients, to obtain the separator of the present invention (area density=60.8 g/m$^2$, thickness=0.15 mm, graft-polymerization rate=9.8%).

| | ingredients | mass % |
|---|---|---|
| (1) | acrylic acid monomer | 30 |
| (2) | benzophenone | 0.1 |
| (3) | iron sulfate | 0.4 |
| (4) | nonionic surface active agent | 0.05 |
| (5) | polyethylene glycol (polymerization degree: 400) | 10 |
| (6) | water | 59.45 |

Example 11

The procedures in Example 8 were repeated, except for using the graft-polymerizing liquid prepared from the following ingredients, to obtain the separator of the present invention (area density=60.8 g/m$^2$, thickness=0.15 mm, graft-polymerization rate=9.8%).

| | ingredients | mass % |
|---|---|---|
| (1) | acrylic acid monomer | 25 |
| (2) | benzophenone | 0.3 |
| (3) | iron sulfate | 0.4 |
| (4) | nonionic surface active agent | 3 |
| (5) | polyethylene glycol (polymerization degree: 400) | 10 |
| (6) | water | 61.3 |

Evaluation (A) COD

The value of the COD was obtained by the following method.

(1) A separator was cut to a size (area=A m2) such that 20 to 40% potassium permanganate as an oxidizing agent as mentioned below was exhausted. For example, the separator was cut into pieces of 5 cm×5 cm (area=0.0025 m$^2$).

(2) The pieces were further cut into smaller pieces (1 to 2 cm×1 to 2 cm) and then loaded into a 300 ml flask.

(3) Pure water (100 ml) was added into the flask by a graduated measuring cylinder.

(4) A sulfuric acid aqueous solution (10 ml) containing 1 part by volume of sulfuric acid and 2 parts by volume distilled water was added to the flask, with shaking.

(5) Shortly after a 5 mmol/l (N/40) potassium permanganate solution (10 ml) was injected by a pipette into the flask and mixed with shaking, the flask was inserted in a hot water bath with a stirrer at 80° C. to carry out a reaction for 30 minutes. When the reaction was carried out, a water surface in the flask was set at a lower position than that of the hot water bath so that the reaction was properly carried out. After the reaction was carried out for 30 minutes, it was confirmed that a red color of potassium permanganate remained. If the amount of the separator was too large, the color of potassium permanganate disappeared. In such a case, the amount of the separator was reduced and the procedures (1) to (5) were repeated.

(6) After the flask was taken from the hot water bath, 10 ml of 12.5 mmol/l (N/40) sodium oxalate solution was injected by a pipette into the flask, and the whole was mixed with shaking to carry out a reaction. At this time, it was confirmed that a red color of potassium permanganate disappeared and turned colorless.

(7) While maintaining the temperature of the solution in the flask at 60 to 80° C., the solution was titrated with a 5 mmol/l (N/40) potassium permanganate solution. When a pale red color was maintained for 30 seconds or more, it was considered that the titration reached a final point. An amount [a ml] of the potassium permanganate solution used was recorded.

(8) Pure water (100 ml) was loaded into a flask, and the procedures (4) to (7) were repeated as a blank test. An amount [b ml] of the potassium permanganate solution used was recorded.

(9) The COD was calculated from the above results by the equation (4):

$$\text{COD (mg·O/m}^2\text{)}=(a-b)\times f\times 0.2\times 1/A \tag{4}$$

wherein a is an amount (ml) of a potassium permanganate solution necessary for a titration, b is an amount (ml) of a potassium permanganate solution necessary for a blank test, f is a factor of a 5 mmol/l potassium permanganate solution, and A is an area (m$^2$) of a separator.

The COD values of the separators prepared in Examples 1 to 7 and Comparative Examples 1 to 2 are shown in Table 1.

(B) Measurement by an X-ray photoelectron spectrometer

Measurement by an X-ray photoelectron spectrometer was carried out, using an X-ray photoelectron spectrometer (JPS-9010MX, Nihon Denshi) under the following conditions:

A separator was rinsed with pure water, dried and fixed on a sample holder. Then a surface to be examined was measured under an ultimate vacuum of 10$^{-6}$ Pa, at an accelerating voltage of 10 KV and a beam current of 10 mA, using Mg—Kα as an exciting source (an X-ray source). The results are shown in Table 1.

(C) Determination of percentages of capacity maintained

As electrode current collectors, a paste nickel positive electrode (width=33 mm; length=182 mm) prepared from a foamed nickel base, and a paste hydrogen-occluded alloy negative electrode (mesh metal alloy; width=33 mm; length 247 mm) were formed. Each of the alkaline battery separators prepared in Examples 1 to 11 and Comparative Examples 1 and 2 was cut into a separator sample (width=35 mm; length=410 mm). The separator sample was sandwiched between the positive and negative electrodes and rolled into a voluted form to obtain SC type electrodes. The electrodes were put into an outer container, 5N potassium hydroxide and 1N lithium hydroxide were poured in as electrolytes, and the container was sealed to obtain a cylindrical nickel-hydrogen battery.

Each of the cylindrical nickel-hydrogen batteries was charged at 0.1 C to 150% with respect to the capacity, then discharged at 0.1 C, and an initial capacity "A" at a final voltage of 1.0 V was measured. Then, each battery was charged at 0.1 C to 150% with respect to the capacity, and allowed to stand in a temperature-controlled room at 65° C. for 5 days. Thereafter, each battery was discharged at 0.1 C, and a capacity "B" at a final voltage of 1.0 V was measured. The percentage of capacity maintained "C" was calculated by the following equation (5):

$$C (\%) = (B/A) \times 100 \quad (5).$$

Ten samples were measured for each of the separators. The results are shown in Tables 1 and 2. In Table 2, two figures in each of the parentheses are a minimum value and a maximum value in ten measurements. The figure above the parentheses is an average. The unit is percentage.

(D) Test of cycle lifetime

The lifetime of the separators prepared in Examples 1 to 7 and Comparative Examples 1 to 2 was determined as follows:

As electrode current collectors, a paste nickel positive electrode (width=33 mm; length=182 mm) prepared from a foamed nickel base, and a paste hydrogen-occluded alloy negative electrode (mesh metal alloy; width=33 mm; length=247 mm) were formed. Each of the alkaline battery separators prepared in Examples 1 to 7 and Comparative Examples 1 and 2 was cut into a separator sample (width=33 mm; length=410 mm). The separator sample was sandwiched between the positive and negative electrodes and rolled into a voluted form to obtain SC type electrodes. The electrodes were put into an outer container, 5N potassium hydroxide and 1N lithium hydroxide were poured in as electrolytes, and the container was sealed to obtain a cylindrical nickel-hydrogen battery. For each of the cylindrical nickel-hydrogen battery, a charging-discharging cycle of 0.2 C, 150% charge, and 1C discharge, a final voltage of 1.0 V discharge was repeated, until a discharge capacity reached 50% of an initial capacity. The number of charging-discharging cycles was recorded. The results are shown in Table 1.

(E) Determination of the amount of ammonia entrapped

For the separators prepared in Examples 7 to 11 and Comparative Example 1, an amount of ammonia entrapped was measured in accordance with the method as mentioned above. Ten samples were measured for each of the separators.

The results are shown in Table 2. In Table 2, two figures in each of the parentheses are a minimum value and a maximum value in ten measurements. The figure above the parentheses is an average. The unit is mmol/g.

TABLE 1

| | A | B | C | COD (mg · O/m$^2$) | Capacity maintained (%) | Lifetime (in cycles) |
|---|---|---|---|---|---|---|
| Example 1 | Pr | Ab | Ab | 205 | 60 | 1000< |
| Comparative Example 1 | Ab | Ab | Pr | 282 | 45 | 500 |
| Example 2 | Pr | Ab | Ab | 198 | 60 | 1000< |
| Example 3 | Pr | Ab | Ab | 201 | 60 | 1000< |
| Example 4 | Pr | S-Pr | Ab | 220 | 60 | 1000< |
| Comparative Example 2 | Ab | Ab | Pr | 260 | 45 | 500 |
| Example 5 | Pr | S-Pr | Ab | 150 | 60 | 1000< |
| Example 6 | Pr | S-Pr | Ab | 210 | 60 | 1000< |
| Example 7 | Pr | S-Pr | Ab | 220 | 60 | 1000< |

A: Presence (Pr), slight presence (S-Pr) or absence (Ab) of the substance having the peak of a bond energy at 530.5 to 531.5 eV when the outer surfaces of fibers forming the separator surface were measured at a generating photoelectron-taking-off angle of 30 by an X-ray photoelectron spectrometer.

B: Presence (Pr), slight presence (S-Pr) or absence (Ab) of the substance having the peak of a bond energy at 530.5 to 531.5 eV when the outer surfaces of fibers forming the separator surface were measured at a generating photoelectron-taking-off angle of 90° by an X-ray photoelectron spectrometer.

C: Presence (Pr) or absence (Ab) of carboxyl groups on the surface region when the outer surfaces of fibers forming the separator surface and the surfaces of fibers forming the inside of the separator were measured by an X-ray microanalyzer.

As shown in Table 1, the nickel-hydrogen battery containing the surface-oxidized fiber sheet or the internally highly-carboxylated fiber sheet of the present invention as a separator exhibits a high oxidation resistance and an excellent self-discharge inhibitory effect, and has a long lifetime.

TABLE 2

| | Amount of ammonia entrapped | Capacity maintained (%) |
|---|---|---|
| Example 8 | 0.55 (0.53 to 0.58) | 61 (58 to 62) |
| Example 9 | 0.58 (0.56 to 0.60) | 62 (60 to 63) |
| Example 10 | 0.63 (0.62 to 0.64) | 63 (62 to 64) |
| Example 7 | 0.48 (0.40 to 0.52) | 60 (50 to 62) |
| Example 11 | 0.43 (0.38 to 0.48) | 58 (48 to 61) |
| Comparative Example 1 | 0.35 (0.32 to 0.38) | 45 (42 to 48) |

As shown in Table 2, the separator containing the highly ammonia-entrapping fiber sheet of the present invention exhibits a high capacity maintained, and an excellent consistency in the rate of capacity maintained. Therefore, the separator has a stable property.

As mentioned above, the alkaline battery separator containing the surface-oxidized fiber sheet of the present invention is not susceptible to oxygen generated in the battery and exhibits a high oxidation resistance and an excellent self-discharge inhibition effect. The alkaline battery separator containing the internally highly-carboxylated fiber sheet of the present invention is not susceptible to oxygen generated in the battery and a high oxidation resistance and an excellent self-discharge inhibition effect. Further, the alkaline battery separator containing the high ammonia-entrapping fiber sheet of the present invention exhibits an excellent self-discharge inhibition effect, an excellent wettability, and an excellent consistency in the rate of capacity maintained.

Although the present invention has been described with reference to specific embodiments, various changes and modifications obvious to those skilled in the art are deemed to be within the spirit, scope, and concept of the invention.

What we claim is:

1. An alkaline battery separator comprising a fiber sheet containing, on outer surfaces of fibers forming a surface of said fiber sheet, a substance having a peak of a bond energy at 530.5 to 531.5 eV which is measured by an X-ray photoelectron spectrometer at a photoelectron-taking-off angle of about 30°.

2. An alkaline battery separator comprising a fiber sheet containing a larger amount of carboxyl groups bonded to surfaces of fibers forming an inside of said fiber sheet than an amount of carboxyl groups bonded to outer surfaces of fibers forming a surface of said fiber sheet.

3. An alkaline battery separator comprising a fiber sheet capable of entrapping ammonia in an amount of 0.4 mmol/g or more in average.

4. The alkaline battery separator according to claim 1, wherein the fiber sheet further contains a larger amount of carboxyl groups bonded to surfaces of fibers forming an inside of said fiber sheet than an amount of carboxyl groups bonded to outer surfaces of fibers forming a surface of said fiber sheet.

5. The alkaline battery separator according to claim 1, wherein the fiber sheet can entrap ammonia in an amount of 0.4 mmol/g or more in average.

6. The alkaline battery separator according to claim 2, wherein the fiber sheet can entrap ammonia in an amount of 0.4 mmol/g or more in average.

7. The alkaline battery separator according to claim 4, wherein the fiber sheet can entrap ammonia in an amount of 0.4 mmol/g or more in average.

8. The alkaline battery separator according to claim 1, wherein the fiber sheet has a potassium-ion-exchangeable capacity of 0.3 to 2 meq/g.

9. The alkaline battery separator according to claim 2, wherein the fiber sheet has a potassium-ion-exchangeable capacity of 0.3 to 2 meq/g.

10. The alkaline battery separator according to claim 3, wherein the fiber sheet has a potassium-ion-exchangeable capacity of 0.3 to 2 meq/g.

11. The alkaline battery separator according to claim 1, wherein the fiber sheet is graft-polymerized.

12. The alkaline battery separator according to claim 2, wherein the fiber sheet is graft-polymerized.

13. The alkaline battery separator according to claim 3, wherein the fiber sheet is graft-polymerized.

14. The alkaline battery separator according to claim 11, wherein a graft-polymerization rate is 5 to 20%.

15. The alkaline battery separator according to claim 12, wherein a graft-polymerization rate is 5 to 20%.

16. The alkaline battery separator according to claim 13, wherein a graft-polymerization rate is 5 to 20%.

17. A process for producing an alkaline battery separator comprising steps of
subjecting a fiber sheet to which a graft-polymerizing liquid containing graft-polymerizable monomers, oligomers, and/or polymers is attached, to a first graft-polymerizing treatment in the presence of oxygen, and then
subjecting said fiber sheet to a second graft-polymerizing treatment under a condition that said fiber sheet is surrounded with a gas-nonpermeable film, to thereby obtain a graft-polymerized fiber sheet for said alkaline battery separator.

18. A process for producing an alkaline battery separator comprising steps of
subjecting a fiber sheet to which a graft-polymerizing liquid containing graft-polymerizable monomers, oligomers, and/or polymers and 0.01 to 3 mass % of a surface active agent is attached, to a first graft-polymerizing treatment in the presence of oxygen, and then
subjecting said fiber sheet to a second graft-polymerizing treatment under a condition that both sides of said fiber sheet are fully covered with a gas-nonpermeable film, to thereby obtain a graft-polymerized fiber sheet for said alkaline battery separator.

19. The process according to claim 17, wherein a concentration of the graft-polymerizable monomers, oligomers, and/or polymers in the graft-polymerizing liquid is 5 to 60 mass %.

20. The process according to claim 18, wherein a concentration of the graft-polymerizable monomers, oligomers, and/or polymers in the graft-polymerizing liquid is 5 to 60 mass %.

21. The process according to claim 17, wherein the graft-polymerizing liquid further contains 3 to 50 mass % of a chain transfer agent.

22. The process according to claim 18, wherein the graft-polymerizing liquid further contains 3 to 50 mass % of a chain transfer agent.

23. The process according to claim 21, wherein the chain transfer agent is polyethylene glycol.

24. The process according to claim 22, wherein the chain transfer agent is polyethylene glycol.

25. The process according to claim 17, wherein the graft-polymerizing liquid further contains 0.05 to 1 mass % of a reaction initiator.

26. The process according to claim 18, wherein the graft-polymerizing liquid further contains 0.05 to 1 mass % of a reaction initiator.

27. The process according to claim 17, wherein the second graft-polymerizing treatment is carried out at 100° C. or more.

28. The process according to claim 18, wherein the second graft-polymerizing treatment is carried out at 100° C. or more.

\* \* \* \* \*